United States Patent
Bamji et al.

(10) Patent No.: US 6,522,395 B1
(45) Date of Patent: *Feb. 18, 2003

(54) NOISE REDUCTION TECHNIQUES SUITABLE FOR THREE-DIMENSIONAL INFORMATION ACQUIRABLE WITH CMOS-COMPATIBLE IMAGE SENSOR ICS

(75) Inventors: Cyrus Bamji, Fremont, CA (US); Edoardo Charbon, Berkeley, CA (US); Shiraz Shivji, Saratoga, CA (US)

(73) Assignee: Canesta, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/727,529

(22) Filed: Nov. 28, 2000

Related U.S. Application Data

(63) Continuation-in-part of application No. 09/401,059, filed on Sep. 22, 1999, now Pat. No. 6,323,942, and a continuation-in-part of application No. 09/502,499, filed on Feb. 11, 2000.
(60) Provisional application No. 60/132,064, filed on Apr. 30, 1999.

(51) Int. Cl.$^7$ .................... G01C 3/08; G01B 11/26
(52) U.S. Cl. .................... 356/5.01; 356/5.04; 356/5.08; 356/141.1
(58) Field of Search .................... 356/141.1, 5.01–5.08

(56) References Cited

U.S. PATENT DOCUMENTS

| | | | |
|---|---|---|---|
| 3,830,567 A | * | 8/1974 | Riegl |
| 4,277,167 A | * | 7/1981 | Eppel |
| 4,708,473 A | * | 11/1987 | Metzdorff |
| 4,764,982 A | * | 8/1988 | Pfund |
| 4,954,972 A | | 9/1990 | Sullivan |
| 5,309,212 A | | 5/1994 | Clark |
| 5,319,387 A | | 6/1994 | Yoshikawa |
| 5,359,511 A | | 10/1994 | Schroeder et al. |
| 5,446,529 A | * | 8/1995 | Stettner et al. ............ 356/4.01 |
| 5,682,229 A | * | 10/1997 | Wangler .................... 356/4.01 |
| 5,739,901 A | * | 4/1998 | Fujioka et al. ............ 356/5.01 |
| 5,767,842 A | | 6/1998 | Korth |
| 5,798,519 A | | 8/1998 | Vock et al. |
| 5,835,204 A | * | 11/1998 | Urbach ..................... 356/5.01 |
| 5,892,575 A | * | 4/1999 | Marino ..................... 356/5.01 |
| 5,936,615 A | | 8/1999 | Waters |
| 5,953,110 A | * | 9/1999 | Burns ....................... 356/5.01 |
| 6,006,021 A | | 12/1999 | Tognazzini |
| 6,043,805 A | | 3/2000 | Hsieh |
| 6,064,354 A | | 5/2000 | DeLuca |
| 6,115,128 A | | 9/2000 | Vann |
| 6,137,566 A | * | 10/2000 | Leonard et al. .......... 356/141.1 |
| 6,241,675 B1 | | 5/2001 | Smith et al. |
| 6,281,878 B1 | | 8/2001 | Montellese |
| 6,310,682 B1 | * | 10/2001 | Gavish et al. ............ 356/5.01 |

* cited by examiner

*Primary Examiner*—Stephen C. Buczinski
(74) *Attorney, Agent, or Firm*—Dorsey & Whitney LLP

(57) ABSTRACT

A three-dimensional imaging system is fabricated on a single IC. The system includes a two-dimensional array of pixel light sensing detectors and dedicated electronics and associated processing circuitry, all preferably fabricated on a single IC using CMOS fabrication techniques. The system includes a detector array comprising a plurality of pixel photodiodes and photodiode circuits, wherein each pixel photodiode acquires delay time data and pulse brightness data simultaneously. The system emits an energy pulse at time t0 and a fraction of the energy is returned to the array by a target object. Photodiodes in the array output a brightness signal B(t) that is integrated. An elapsed time ET from t0 to when said B(t) attains a predetermined threshold value is determined, where the slope of B(t) is B/PW, where B is B(t) after integrating over a time equal to the emitted pulse width PW. Time-of-flight TOF representing time from t0 to when a photodiode begins to detect energy is determined, where TOF=ET−IT, where IT is proportional to PW/B. A system processor determines distance from the system to the target object, from TOF and the velocity of light, and can translate TOF into commands to control electronic devices.

16 Claims, 10 Drawing Sheets

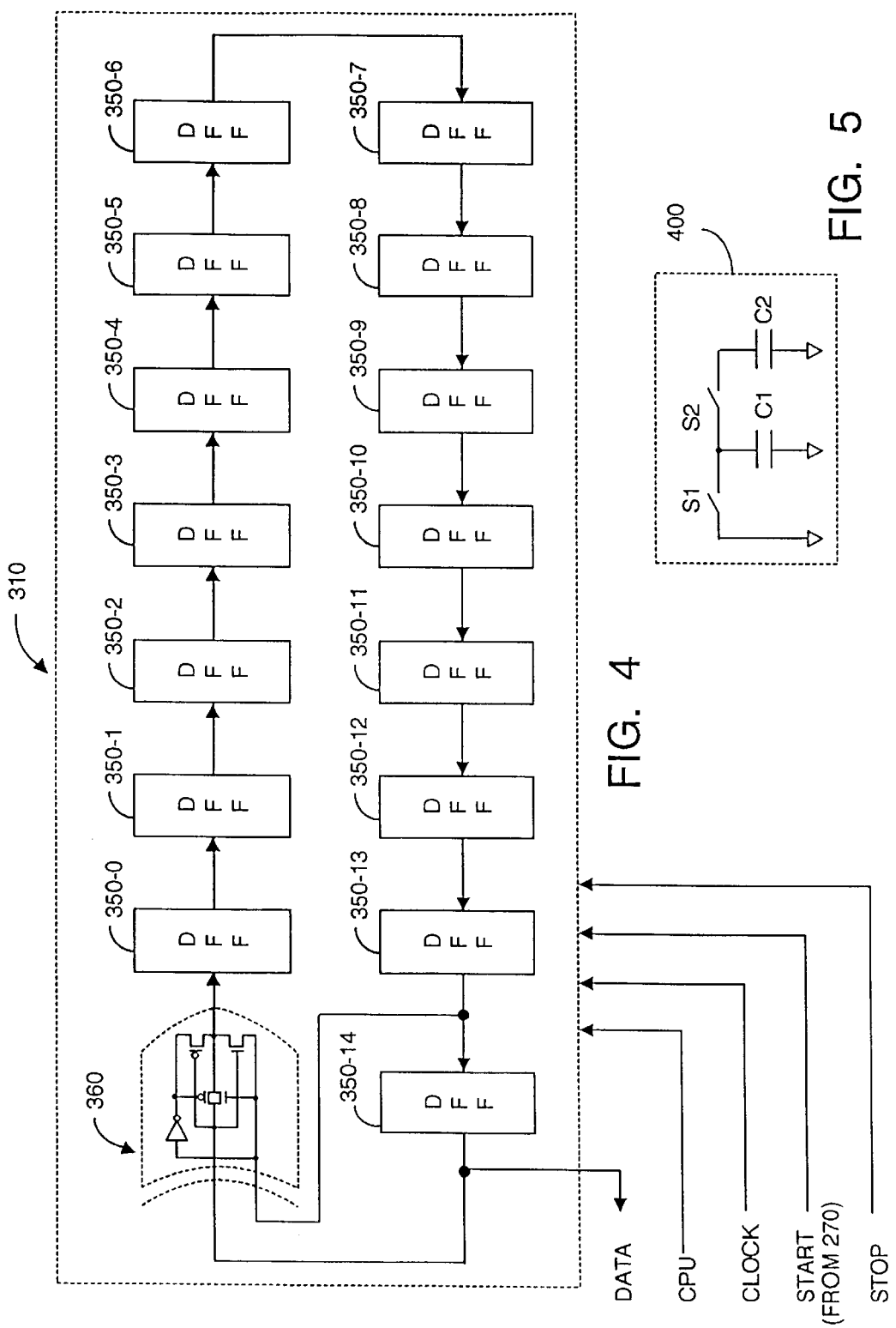

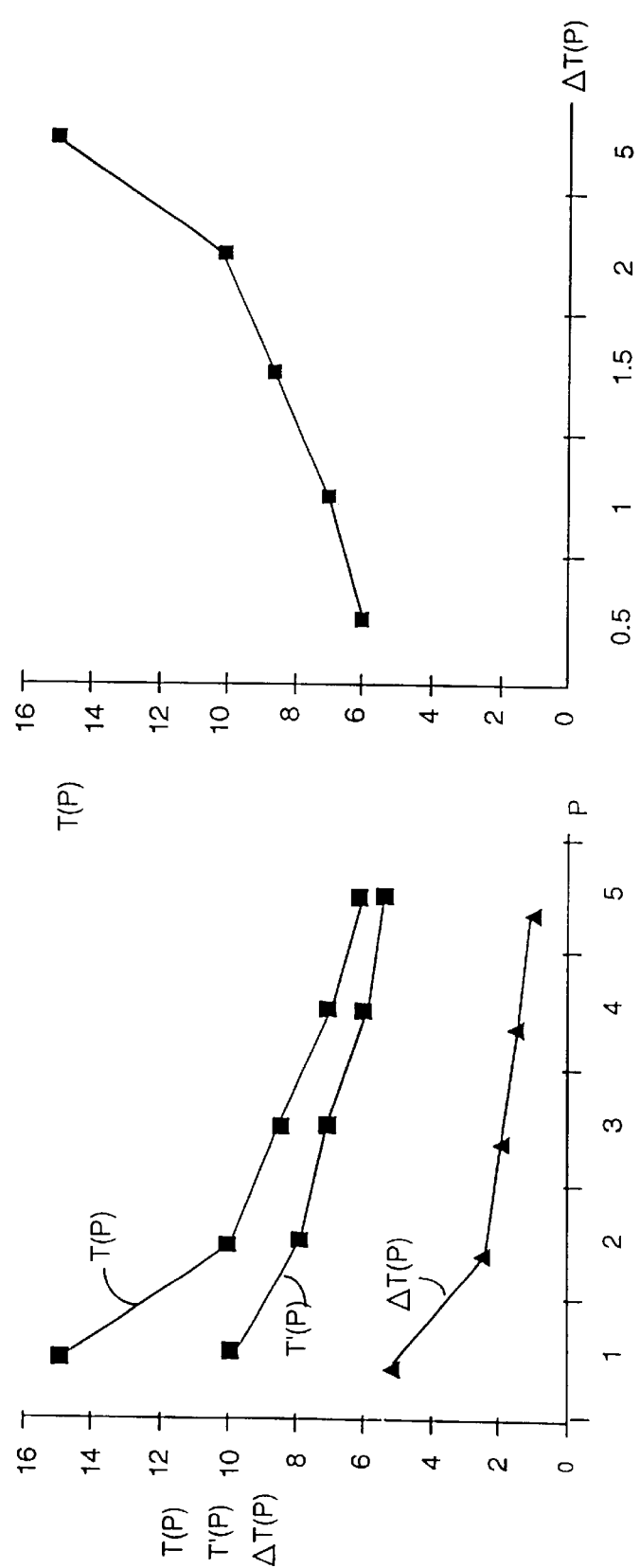

NOISE REDUCTION TECHNIQUES SUITABLE FOR THREE-DIMENSIONAL INFORMATION ACQUIRABLE WITH CMOS-COMPATIBLE IMAGE SENSOR ICS

This is a continuation-in-part of Ser. No. 09/401,059 filed Sep. 22, 1999 now U.S. Pat. No. 6,323,942, and a continuation-in-part of Ser. No. 09/502,499 filed Feb. 11, 2000, which claims the benefit of application Ser. No. 60/133,064 filed Apr. 30, 1999.

RELATION TO PREVIOUSLY FILED APPLICATION

This is a continuation-in-part application from applicants' U.S. patent application Ser. No. 09/401,059 filed on Sep. 22, 1999 entitled CMOS-COMPATIBLE THREE-DIMENSIONAL IMAGE SENSOR IC now U.S. Pat. No. 6,323,942 (Nov. 27, 2001), and from co-pending U.S. patent application Ser. No. 09/502,499 filed on Feb. 11, 2000, entitled METHOD AND APPARATUS FOR CREATING A VIRTUAL DATA ENTRY DEVICE.

FIELD OF THE INVENTION

The invention relates generally to range finder type image sensors, and more particularly to such sensors as may be implemented on a single integrated circuit using CMOS fabrication.

BACKGROUND OF THE INVENTION

Electronic circuits that provide a measure of distance from the circuit to an object are known in the art, and may be exemplified by system 10 FIG. 1. In the generalized system of FIG. 1, imaging circuitry within system 10 is used to approximate the distance (e.g., Z1, Z2, Z3) to an object 20, the top portion of which is shown more distant from system 10 than is the bottom portion. Typically system 10 will include a light source 30 whose light output is focused by a lens 40 and directed toward the object to be imaged, here object 20. Other prior art systems do not provide an active light source 30 and instead rely upon and indeed require ambient light reflected by the object of interest.

Various fractions of the light from source 30 may be reflected by surface portions of object 20, and is focused by a lens 50. This return light falls upon various detector devices 60, e.g., photodiodes or the like, in an array on an integrated circuit (IC) 70. Devices 60 produce a rendering of the luminosity of an object (e.g., 10) in the scene from which distance data is to be inferred. In some applications devices 60 might be charge coupled devices (CCDs) or arrays of CMOS devices.

CCDs typically are configured in a so-called bucket-brigade whereby light-detected charge by a first CCD is serial-coupled to an adjacent CCD, whose output in turn is coupled to a third CCD, and so on. This bucket-brigade configuration precludes fabricating processing circuitry on the same IC containing the CCD array. Further, CCDs provide a serial readout as opposed to a random readout. For example, if a CCD range finder system were used in a digital zoom lens application, even though most of the relevant data would be provided by a few of the CCDs in the array, it would nonetheless be necessary to readout the entire array to gain access to the relevant data, a time consuming process. In still and some motion photography applications, CCD-based systems might still find utility.

As noted, the upper portion of object 20 is intentionally shown more distant that the lower portion, which is to say distance Z3>Z3>Z1. In an range finder autofocus camera environment, devices 60 approximate average distance from the camera (e.g., from Z=0) to object 10 by examining relative luminosity data obtained from the object. In FIG. 1, the upper portion of object 20 is darker than the lower portion, and presumably is more distant than the lower portion. In a more complicated scene, focal distance to an object or subject standing against a background would be approximated by distinguishing the subject from the background by a change in luminosity. In a range finding binocular application, the field of view is sufficiently small such that all objects in focus are at substantially the same distance. In the various applications, circuits 80, 90, 100 within system 10 would assist in this signal processing. As noted, if IC 70 includes CCDs 60, other processing circuitry such as 80, 90, 100 are formed off-chip.

Unfortunately, reflected luminosity data does not provide a truly accurate rendering of distance because the reflectivity of the object is unknown. Thus, a distant object surface with a shiny surface may reflect as much light (perhaps more) than a closer object surface with a dull finish.

Other focusing systems are known in the art. Infrared (IR) autofocus systems for use in cameras or binoculars produce a single distance value that is an average or a minimum distance to all targets within the field of view. Other camera autofocus systems often require mechanical focusing of the lens onto the subject to determine distance. At best these prior art focus systems can focus a lens onto a single object in a field of view, but cannot simultaneously measure distance for all objects in the field of view.

In general, a reproduction or approximation of original luminosity values in a scene permits the human visual system to understand what objects were present in the scene and to estimate their relative locations stereoscopically. For non-stereoscopic images such as those rendered on an ordinary television screen, the human brain assesses apparent size, distance and shape of objects using past experience. Specialized computer programs can approximate object distance under special conditions.

Stereoscopic images allow a human observer to more accurately judge the distance of an object. However it is challenging for a computer program to judge object distance from a stereoscopic image. Errors are often present, and the required signal processing requires specialized hardware and computation. Stereoscopic images are at best an indirect way to produce a three-dimensional image suitable for direct computer use.

Many applications require directly obtaining a three-dimensional rendering of a scene. But in practice it is difficult to accurately extract distance and velocity data along a viewing axis from luminosity measurements. Nonetheless many application require accurate distance and velocity tracking, for example an assembly line welding robot that must determine the precise distance and speed of the object to be welded. The necessary distance measurements may be erroneous due to varying lighting conditions and other shortcomings noted above. Such applications would benefit from a system that could directly capture three-dimensional imagery.

Although specialized three dimensional imaging systems exist in the nuclear magnetic resonance and scanning laser tomography fields, such systems require substantial equipment expenditures. Further, these systems are obtrusive, and are dedicated to specific tasks, e.g., imaging internal body organs.

In other applications, scanning laser range finding systems raster scan an image by using mirrors to deflect a laser beam in the x-axis and perhaps the y-axis plane. The angle of defection of each mirror is used to determine the coordinate of an image pixel being sampled. Such systems require precision detection of the angle of each mirror to determine which pixel is currently being sampled. Understandably having to provide precision moving mechanical parts add bulk, complexity, and cost to such range finding system. Further, because these systems sample each pixel sequentially, the number of complete image frames that can be sampled per unit time is limited.

Attempts have been made in the prior art to incorporate some logic at each image sensor pixel to process at least some data acquired by the pixel. Such implementations are sometimes referred to as smart pixels. For example, El Gamal et al has attempted to provide special circuitry within pixel to carry-out analog-to-digital conversion of all light sensed by the pixel. Carver Mead and others have configured pixels such that pixels can communicate with to adjacent pixels, in an attempt to directly detect object contours by examining discontinuities in the sensed brightness pattern.

El Gamal, Carver Mead, and other prior art smart pixel approaches to imaging essentially process images based upon overall brightness patterns. But in an image system that seeks to acquire three-dimensional data, the performance requirement for the sensor pixels requires capabilities quite different than what suffices for ordinary brightness acquisition and processing. Further, whereas prior art smart pixel approaches result in brightness-based data that is presented to an image viewable by humans, three-dimensional data should be in a format readily processed and used by digital computer or processor systems.

Thus, there is a need for a new type of smart pixel implantation for use in a direct three-dimensional imaging system, in which parameters of smart pixels in an array could advantageously be controlled dynamically by a processor or computer system that preferably was implemented on the same IC as the detector array. If such an implementation could be provided, various sensor array parameters could be dynamically adjusted to perform optically, as the situation at hand required. Such an IC should further include additional hardware and circuitry to make on-the-fly real-time tradeoffs and adjustments or such parameters to promote processing of detection signals. Preferably such single IC system should be implementable using CMOS fabrication techniques, should require few discrete components, and have no moving components. Optionally, the system should be able to output data from the detectors in a non-sequential or random fashion. Further, there is a need for a system that can be implemented without reliance upon high speed counters and/or shutter mechanisms.

The present invention provides such a system.

SUMMARY OF THE PRESENT INVENTION

Applicants' parent application and the present invention provide a system that measures distance and velocity data in real time using time-of-flight (TOF) data rather than relying upon luminosity data. Both systems are CMOS-compatible and provide such three-dimensional imaging without requiring moving parts. Both systems may be fabricated on a single IC containing both a two-dimensional array of CMOS-compatible smart TOF pixel detectors that sense photon light energy, sensor array support circuitry, sensor control and processor interface circuitry including a microprocessor and control processor unit. The terms pixel and pixel detector may be used interchangeably herein to refer to a photodiode element (among an array of such elements) that senses incoming photon energy, and circuitry associated with that particular element to enhance a signal output by the pixel responsive to detecting photon energy.

The preferably IC-located microprocessor continuously triggers an energy emitting source (e.g., a laser or LED) whose light output pulses are at least partially reflected by points on the surface of the object to be imaged. The energy emitter may be fabricated off-chip.

Each system includes optical elements including an off-chip filter and lens that focuses incoming energy reflected from the target object to ensure that each pixel detector in the array receives energy only from a single point on the surface of the imaged object. Note that all optical paths from energy emitter to reflecting object surface points to pixel detectors in the array are of equal length. The array of pixel detectors output signals, responsive to sensed photon light energy, and the output signals are processed by analog and digital circuitry that is also on the same IC chip containing the array. The three-dimensional data is acquired by the array of pixel detectors with independent measurements at each pixel. On-chip measured TOF data may be output in random rather than sequential order, and object tracking and other measurements requiring a three-dimensional image are readily made. In the parent application and in the present invention, the overall system can be small, robust and requires relatively few off-chip discrete components, and consumes very low power such that battery operation is possible. IC yield is improved by adopting circuit layout and design techniques such as common centroid, and appropriate device sizing to reduce the effect of process variation upon system operation.

In the parent application, the overall system required extremely high speed counters or a shutter mechanism. Thus, in a first embodiment in the parent application, for each pixel in the two-dimensional array the IC further includes an associated pulse detector, a high speed counter, and access to an on-chip high speed clock. When each light emitted pulse starts, each pixel detector's counter begins to count clock pulses and accumulates counts until incoming reflected light photons are detected by that pixel. Thus, the accumulated count value in each high speed counter is a direct digital measure of roundtrip TOF from the system to the reflecting object point corresponding to that pixel. On-chip circuitry can use such TOF data to readily simultaneously measure distance and velocity of all points on an object or all objects in a scene.

A second embodiment of the parent application avoided the need for high speed detectors, counters, and clock. In this embodiment, the IC contains a similar two-dimensional array of pixel detectors, and further includes for each pixel a shutter mechanism and a charge integrator. The shutter mechanism turns on or off an output charge path from each pixel detector to the charge integrator, which may be a capacitor. Before a system-emitted light pulse, the microcontroller opens all shutters, which permits each integrator to collect any charge being output by the associated pixel detector. As object-reflected light energy begins to return to the detector array, pixels focused upon closer object surface points will start to detect and output charge, and after a while pixels focused on more distance points will begin to do likewise. Stated differently, integrators associated with such pixels will begin to integrate charge sooner in time. After a time approximating the emitted light pulse width, all shutters are closed (preferably simultaneously), thus terminating further charge accumulations. The accumulated charge magnitude for each pixel provides direct roundtrip TOF data to the object point upon which such pixel is focused. Preferably one set of data is collected with the shutter remaining on for perhaps the period of the emitted light pulse train frequency. Charge gathered during this data set represents point-by-point reflected luminosity for the object surface, which permits correcting for errors caused by more distant but more reflective object surface portion.

After designing the various embodiments of the invention disclosed in the parent application, applicants designed to provide a further design in which fast counters and/or shutters could be eliminated. Propagating fast clock pulses throughout the IC containing the invention without injecting excessive noise components to various circuitry is a challenging task. The alternative embodiment in the parent application avoided high speed counters and relied upon shutter mechanisms. However a new approach was undertaken in the present invention, in implementing a three-dimensional TOF imaging system. As disclosed herein, an analog measurement involving a charge/discharge capacitor signal is used as an alternative to the high speed counters, yet no shutter mechanism is required.

In the present invention, at time T0 an emitted pulse having pulse width PW is transmitted, and some of the transmitted energy may be reflected back towards the present invention by an object target. Detector photodiodes in the array output a brightness signal B(t) in response to detected reflected energy, and the B(t) signal is integrated, preferably using a capacitor, to produce a ramp-like signal. An elapsed time ET from t0 to when B(t) attains a predetermined threshold value Xref is determined, where the slope of B(t) is B/PW. The maximum value of B is B(t) after integrating over a time equal to the emitted pulse width PW. Time-of-flight TOF represents time from t0 to when a photodiode detector begins to detect energy is determined, where TOF=ET−IT, and where IT is proportional to PW/B. A system processor determines distance from the system to the target object, from TOF and the velocity of light. Each pixel photodiode acquires delay time data and pulse brightness data simultaneously. Thus, IT is calculated using the slope of the ramp-like signal, which slope can be calculated from the perceived brightness. Brightness (B) is the integration value after the entire return pulse has arrived, and since PW of the emitted energy pulse is known, the integration slope is given by B/PW. Thus, given B and ET, IT is subtracted from ET to yield TOF, essentially in real-time, using on-chip signal processing components.

Other features and advantages of the invention will appear from the following description in which the preferred embodiments have been set forth in detail, in conjunction with their accompanying drawings.

BRIEF DESCRIPTION OF THE DRAWINGS

FIG. 4 is a block diagram of a preferred implementation of a high speed counter PRSC counter, as used in at least one embodiment of the invention described in the parent application;

FIG. 5 depicts a preferred implementation for measuring subdivision capacitor charge, according to an embodiment of the invention described in the parent application;

FIG. 6A depicts T(P), T'(P) and ΔT(P) vs P, as used in an embodiment of the invention described in the parent application;

FIG. 6B depicts T(P) vs. ΔT(P), as used in an embodiment of the invention described in the parent application;

DETAILED DESCRIPTION OF THE PREFERRED EMBODIMENT

Figure 1:
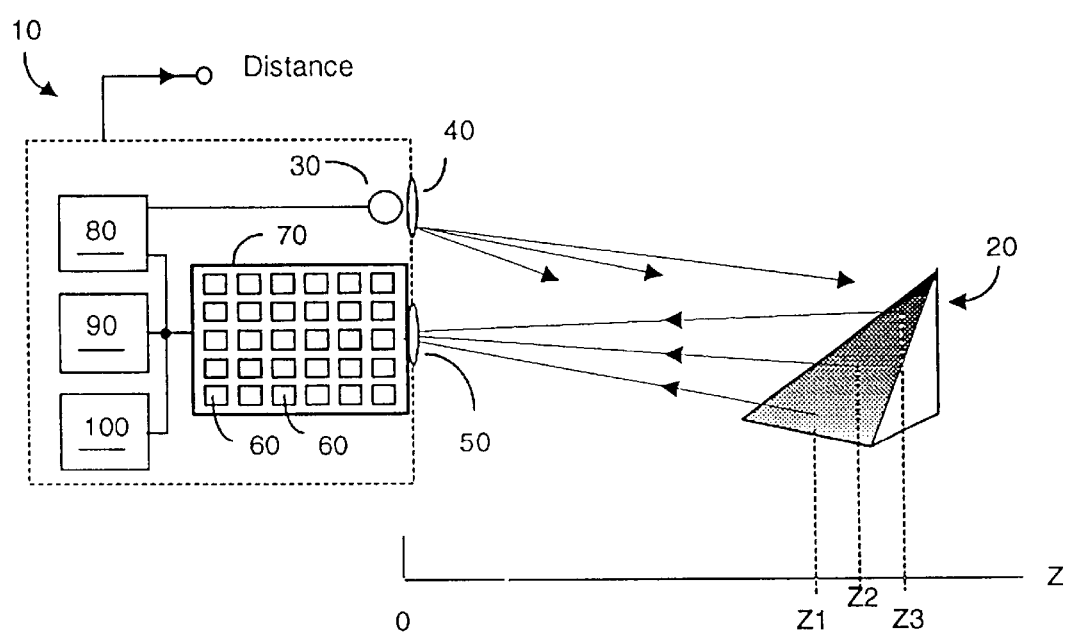
FIG. 1 is a diagram showing a generic luminosity-based range finding system, according to the prior art.
Figure 2:
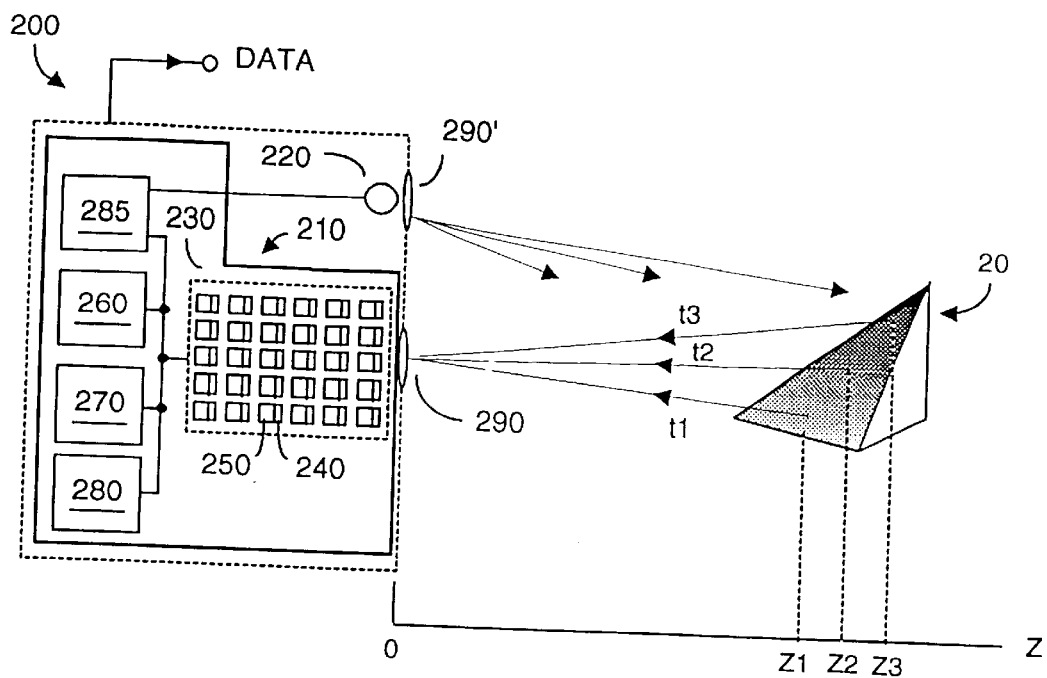
FIG. 2 is a diagram showing an a three-dimensional imaging system implemented on a single IC, according to a first embodiment of the invention described in the parent application.

For the sake of completeness, applicants' invention as disclosed in the parent application and as described with respect to FIGS. 2–9 will also be described herein. FIG. 2 is a block diagram depicting invention 200 (as described in the parent application), a three-dimensional imaging system that preferably is fabricated on a single IC 210. The system requires no moving parts and relatively few off-chip components, primarily an light emitting diode (LED) or laser source 220 and associated optical focusing system. Indeed if suitable shielding were provided, one might bond laser source 220 onto the common substrate upon which IC 210 is fabricated.

System 200 includes an array 230 of pixel detectors 240 (e.g., photodiodes), each of which has dedicated circuitry 253 for processing detection charge output by the associated detector. In a typical application, array 230 might include 100×100 pixels 230, and thus include 100×100 processing circuits 253. Preferably IC 210 also includes a microprocessor or microcontroller unit 260, memory 270 (which preferably includes random access memory or RAM and read-only memory or ROM), and various computing and input/output (I/O) circuitry 285.

Among other functions, controller unit 260 may perform distance to object and object velocity calculations. Preferably the two-dimensional array 230 of pixel sensing detectors is fabricated using standard commercial silicon technology, which advantageously permits fabricating circuits 250, 260, 270, and 285 on the same IC 210. Understandably, the ability to fabricate such circuits on the same IC with the array of pixel detectors can shorten processing and delay times, due to shorter signal paths.

Figure 3:
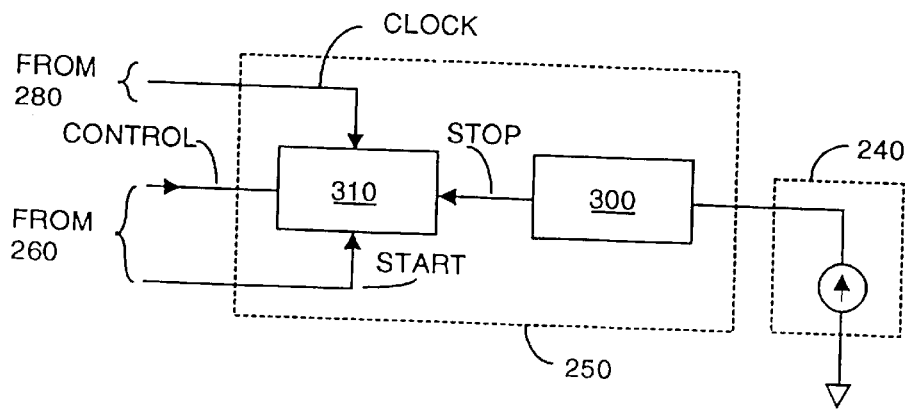
FIG. 3 is block diagram showing an individual pixel detector with associated photon pulse detector and high speed counter, according to the invention described in the parent application.

Each pixel detector may be represented as a parallel combination of a current source, an ideal diode, shunt impedance and noise current source. Each pixel detector will output a current proportional to the amount of incoming photon light energy falling upon it. Preferably CMOS fabrication is used to implement the array of CMOS pixel diodes or photogate detector devices. For example photodiodes may be fabricated using a diffusion-to-well, or a well-to-substrate junction. Well-to-substrate photodiodes are more sensitive to infrared (IR) light, exhibit less capacitance, and are thus preferred. As shown in FIG. 3, a circuit 250 is associated with each pixel detector 240, and includes a pulse peak detector 300, a high speed counter 310, and has access to the high speed clock 280. High speed clock 280, preferably formed on IC 210, outputs a continuous train of high frequency clock pulses (perhaps 250 ns pulse width) at a fixed frequency of perhaps 2 GHz with a duty cycle of perhaps 0.1% while the pulses are being output. Of course, other high speed clock parameters could instead be used. This pulse train is coupled to the input port of each high speed counter 310. Preferably each counter 310 also has a port to receive a START signal (e.g., start now to count), a port to receive a STOP signal (e.g., stop counting now), and a port to receive a CONTROL signal (e.g., reset accumulated count now). The CONTROL and START signals are available from controller 260, the CLOCK signal is available from clock unit 280, and the STOP signal is available from pulse peak detector 300.

In overview, system 200 operates as follows. At time t0, microprocessor 260 commands light source 220 to emit a pulse of light of known wavelength, which passes through focus lens 290' and travels to object 20 at the speed of light (C), 300 Km/sec. If light source 220 is sufficiently powerful, lens 290' may be dispensed with. At the surface of the object being imaged at least some of the light may be reflected back toward system 200 to be sensed by the detector array.

At or before time t0, each pixel counter 310 in array 230 receives a CONTROL signal from controller 260, which resets any count previously held in the counter. At time t0, controller 260 issues a START command to each counter, whereupon each counter begins to count and accumulate CLOCK pulses from clock 280. During the roundtrip time of flight (TOF) of a light pulse, each counter accumulates CLOCK pulses, with a larger number of accumulated clock pulses representing longer TOF, which is to say, greater distance between a light reflecting point on the imaged object and system 200.

The fundamental nature of focus lens 290 associated with system 200 is such that reflected light from a point on the surface of imaged object 20 will only fall upon the pixel in the array focused upon such point. Thus, at time t1, photon light energy reflected from the closest point on the surface of object 20 will pass through a lens/filter 290 and will fall upon the pixel detector 240 in array 230 focused upon that point. A filter associated with lens 290 ensures that only incoming light have the wavelength emitted by light source 220 falls upon the detector array unattenuated.

Assume that one particular pixel detector 240 within array 230 is focused upon a nearest surface point on object 20. The associated detector 300 will detect current that is output by the pixel detector in response to the incoming photon energy from such object point. Preferably pulse detector 300 is implemented as an amplifying peak detector that senses a small but rapid change in pixel output current or voltage. When the rapidly changing output current is sufficiently large to be detected, logic within detector 300 (e.g., an SR flipflop) toggles to latch the output pulse, which is provided as the STOP signal to the associated counter 310. Thus, the number of counts accumulated within the associated counter 310 will be indicative of roundtrip TOF to the near surface of object 20, a calculable distance Z1 away.

Distance Z1 may be determined from the following relationship in which C is the velocity of light:

$$Z1 = C \cdot (t1)/2$$

At some later time t2 photon energy will arrive at lens 290 from a somewhat more distant portion of object 20, and will fall upon array 230 and be detected by another pixel detector. Hitherto the counter associated with this other detector has continued to count CLOCK pulses starting from time t0, as indeed have all counters except for the counter that stopped counting at time t1. At time t2, the pulse detector associated with the pixel just now receiving and detecting incoming photon energy will issue a STOP command to the associated counter. The accumulated count in this counter will reflect roundtrip TOF to the intermediate point on object 20, distance Z2 away. Within IC 210, controller 260 executing software stored in memory 270 can calculate distance and velocity associated with the TOF data for each light reflecting point on the object surface. Such data, or even raw TOF data, may be exported from the IC as DATA, perhaps to be further processed off-chip. Preferably DATA is exported in a format compatible to computer processing systems.

In similar fashion, at time t3 yet another pixel detector in the array will detect sufficient just-arriving photon energy for its associated pulse detector 300 to issue a STOP command to the associated counter. The accumulated count in this counter represents TOF data for the farthest distance Z3 of object 20.

Some pixels in the array may of course not receive sufficient reflected light from the object point upon which they are focused. Thus, after a predetermined amount of time (that may be programmed into controller 260), the counter associated with each pixel in the sensor array will have been stopped due to pulse detection, or will be assumed to hold a count corresponding to a target at distance Z=infinity.

In a motion picture application, e.g., where system 200 is perhaps used to calculate surface distances to objects to be matted, assume that the sensor array is to operate continuously at 30 frames per second, which is to say each frame shall last less than 0.33 seconds. In this application, objects at distances greater than about 50,000 Km (e.g., Z=C·0.33 s/2) cannot be detected. In practical applications, however, system 200 will normally be used to image objects within a range of 100 m or less, and the above theoretical limit will not pose a problem. Thus, the predetermined time will be approximate 660 ns (e.g., 100 m·2/C), and any pixel not outputting a peak detection pulse after 660 ns may safely be assumed to be focused upon a target image point at Z=infinity.

Preferably approximately one-hundred detected reflected light pulse signals are integrated, and the TOF distance value for each pixel in the array is determined and preferably stored in a frame buffer in RAM associated with unit 270. Preferably microprocessor 260 examines consecutive frames stored in RAM to identify objects in the field of view scene. Microprocessor 260 can then compute object velocity. In addition to calculating distance and velocity, the microprocessor and associated on-chip circuitry can be programmed to recognize desired image shapes. Any or all of this data (denoted DATA in FIG. 2) can be exported from the IC to an external computer for further processing, for example via a universal serial bus.

The above example described how three pixel detectors receiving photon energies at three separate times t1, t2, t3 turn-off associated counters whose accumulated counts could be used to calculate distances Z1, Z2, Z3 to object 20.

In practice, the invention will process not three but thousands or tens of thousands of such calculations per each light pulse, depending upon the size of the array. Such processing can occur on IC chip 210, for example using microprocessor 260 to execute routines stored (or storable) in memory 280. Each of the pixel detectors in the array will have unique (x,y) axis locations on the detection array, and the count output from the high speed counter associated with each pixel detector can be uniquely identified. Thus, TOF data gathered by two-dimensional detection array 230 may be signal processed to provide distances to a three-dimensional object surface.

It will be appreciated that output from CMOS-compatible detectors 240 may be accessed in a random manner if desired, which permits outputting TOF DATA in any order.

Light source 220 is preferably an LED or a laser that emits energy with a wavelength of perhaps 800 nm, although other wavelengths could instead be used. Below 800 nm wavelength, emitted light starts to become visible and laser fabrication becomes more difficult. Above 900 nm photodetector efficiency drops off rapidly, and in any event, 1100 nm is the upper wavelength for a device fabricated on a silicon substrate, such as IC 210. As noted, by emitted light pulses having a specific wavelength, and by filtering out incoming light of different wavelength, system 200 is operable with or without ambient light. The ability of system 200 to function in the dark can be advantageous in certain security and military type imaging applications.

As noted, lens 290 preferably focuses filtered incoming light energy onto sensor array 230 such that each pixel in the array receives light from only one particular point (e.g., an object surface point) in the field of view. The properties of light wave propagation allow an ordinary lens 290 to be used to focus the light onto the sensor array. If a lens is required to focus the emitted light, a single lens could be used for 290, 290' if a mirror-type arrangement were used.

In practical applications, sensor array 230 preferably has sufficient resolution to differentiate target distances on the order of 1 cm. Stated differently, this implies each pixel must be able to resolve time differences on the order of 70 ps (e.g., 2·1 cm/C). In terms of a CMOS-implemented system specification, in the parent application, high speed counters 310 were required to resolve time to within about 100 ps, peak pulse detectors 300 must be low-noise high speed units also able to resolve about 100 ps with a detection sensitivity on the order of perhaps a few microvolts ($\mu V$). In that application, accurate distance measurements will require that the pulse detector response time be removed from the total elapsed time, and the CLOCK signal output by circuit 280 (see FIG. 2) required a period on the order of about 100 ps.

As noted above, each counter 310 preferably can resolve distances on the order of 1 cm, which implies resolving time to the order of about 70 ps. Using a 12-bit counter with a 70 ps cycle time would yield a maximum system detection distance of about 40 m (e.g., $2^{12} \cdot 1$ cm). Implementing an ordinary 12-bit counter would typically require perhaps 48 gates, each of which would require typically 30 ps, for a total propagation time of perhaps about 1.5 ns. This in turn would limit the fastest system clock cycle time to at least about 1.5 ns. Using carry look-ahead hardware might, at a cost, reduce counter propagation time, but would still render a system 70 ps cycle time quite difficult to achieve.

In a first preferred embodiment of the invention described in the parent application, a so-called pseudo random sequence counter (PRSC), sometimes termed a linear shift register (LSR), is used. A counter 310 so implemented does not require rippling or propagating a signal through the entire counter. Instead, the signal ripples only through about two levels of logic, which implies that 60 ps or so propagation is realizable using existing CMOS technology. On the other hand, unlike conventional sequential counters, a PRSC counter counts though a seemingly random sequence of numbers. Hence a 12-bit PRSC will count though all the numbers between 0 and 4096 but in seemingly random order, e.g., 107, 3733, 28, etc. However in the embodiment under discussion, such randomness is dealt with by translating the PRSC-generated number into a sequential count number using decoding logic. Such translation operation is not time critical, and may be performed with auxiliary logic circuitry including controller 260 on IC 210 after detection of reflected light pulses.

FIG. 4 depicts a preferred embodiment of a high speed counter 310 implemented as a 15-bit PRSC unit, according to the parent application. In this embodiment, PRSC 310 comprises 15 series-coupled shift registers denoted 350-0, 350-1, . . . 350-14, one for each bit. Input to the first bit (350-0) is a logic function of other bits in the overall shift register. For a given counter bit length, the correct feedback function that maximizes counter count length is given in an application note published by Xilnx (XAPP 052, Jul. 7, 1996 (ver. 1.1) entitled "Linear Feedback Shift Register Taps", and included herein by reference. The bits required for the feedback function as well as the feedback complexity depend upon counter bit length.

For maximum counter speed and efficiency and speed it is advantageous to select a counter bit length whose feedback function is readily implemented using a small number of bits. The above-referenced Xilinx application note indicates that the simplest function is a two input XNOR function, denoted 360 in FIG. 4, which is recommended for a 10-bit, a 15-bit, and a 17-bit feedback register. The counter length should simplify the feedback bit physical layout by using a feedback bit close to the last bit or the first bit. Typically the output of some register bits and the last register bit are fedback to the beginning of the register. However a counter with a linear layout will require passing the feedback signal through a comparatively long wire from the last bit to the first bit, an undesirable configuration for performance critical counters used in system 200.

A long feedback path (and associated time delay) may be avoided by folding the counter at least in half such that the last bits and other feedback tapped bits are close to the first bit in the overall register. For this reason, the 15-bit counter shown in FIG. 4 was selected, in which bits 14 and 15 are fedback into bit 1 via XNOR gate 360, and the various registers are implemented with flipflops clocked by the common CLOCK signal. This configuration advantageously results in the last bits being physically close to the first bit. A DATA signal is output from the last register of each counter, as shown. Inputs to each counter 310 include CLOCK, START, STOP, and a CPU-issued CONTROL signal, as shown in FIG. 4.

As noted, the counter/shift registers must function at cycle times on the order of a few gate delays, which implies the latches or flipflops comprising the high speed counter must also operate such cycle times. This constraint excludes the use of multiphase clocking due to probable clock skew between phases that could exceed a few gate delays. Further, latches requiring both CLOCK and its complement are avoided due to probable excess skew between the two signals. Thus, the preferred embodiment uses a common single phase CLOCK signal, and latches or flipflops implementing each high speed counter 310 do not require complementary CLOCK signals. True single-phase clocking schemes (TSPC) including the so-called NORA TSPC scheme are known to those skilled in the relevant art.

Maximum overall clock speed is governed by the delay of the feedback function at the first bit of the high speed counter (see FIG. 4), whose delay must therefore be minimized. For this reason, the pass gate configuration shown within block 360 is preferred to implement the two-input XNOR gate function.

A high clock rate and resultant 70 ps high speed counter performance is achievable using a 0.18$\mu$ process. However this performance may be difficult to attain using the 0.35$\mu$ or larger process required to obtain the greater sensitivity that IR wavelength light detection, e.g., 800 nm, can provide.

To help compensate for the possible use of larger fabrication gate widths, a two-tier approach may be used to implement counters 310. In such approaches, the CLOCK rate that is counted is actually slower than the minimum resolvable time of the overall system. Each clock tick of the counter is further subdivided into smaller subdivisions. Within a clock tick a so-called subdivision capacitor is charged, and the amount of charge on the capacitor is used to identify arrival time of a detected light energy pulse within a CLOCK period.

For example, subdivider capacitor charging may be started as soon as the incoming light pulse (or echo pulse) is detected, and charging of this capacitor is halted with the rising edge of the following clock period. As a result, the amount of charge on the subdivider capacitor will correspond to the differential between start of the detected return pulse and the start of the next clock period. An analog/digital (A/D) converter can measure the accumulated subdivider capacitor charge and determine therefrom charging time and thus arrival time of the detected pulse within the clock period.

The number of subdivisions for each clock tick can be small, for example on the order of ten subdivisions. A/D conversion time is not a critical factor, and conversion non-linearity can be corrected by software. A simple A/D converter 400 may thus be implemented as shown in FIG. 5, in which $C_2$ is a subdivision capacitor, and solid state switches $S_1$ and $S_2$ are alternately turned on and off. The rate of discharge of $C_2$ is proportional to $C_1/C_2$ ratio. Thus the charge on $C_2$ may be determined from the number of switch cycles required to reduce the voltage on $C_2$ below a certain level.

Referring to FIG. 4, the count values in PRSC counter 310 may first be stored in RAM (e.g., in memory 280), which permits also using the same PRSC counter to count the number of switch cycles required to discharge the associated subdivision capacitor $C_2$ Referring to FIGS. 2 and 3, the photodetection and associated amplification circuitry 240, 250 must be able to detect extremely low levels of incoming photon energy, which means signal-to-noise (S/N) ratio on the detector outputs must be maximized. Preferably a differential approach is used to reduce effects of capacitive coupling and power supply noise. In this approach, a dummy pixel sensor (e.g., photodiode) having noise characteristics similar to an actual detector 240 is used. However the dummy sensor is covered with metal to prevent it from detecting incoming light. Thus, dummy detector output will be a pure noise signal having no light signal component. A differential comparator compares the pure noise output from the dummy detector with the signal plus noise output from an actual detector 240. The differential comparator output thus cancels the common mode noise present in both inputs, thereby enhancing the output S/N ratio.

Detector response time is compensated for as described below, with the result that detector repeatability is largely dependent upon noise. Multiple samples of the detector output may be taken and averaged to further reduce the standard deviation for detection time error. If a is the standard deviation of the error for one detection sample, then the standard deviation for the average of n samples will be:

$$\sigma_n = \sigma/\sqrt{n}.$$

In practice, detectors 240 and associated amplifier circuitry 250 may have response times substantially greater than 100 ps. Indeed the slew rate of light source 220 may be 10 ns or so, and is regarded as a response time. Each of these response times will vary with the characteristics of the technology with which system 200 is fabricated, but is otherwise independent of the distance to object 20. Additional delay resulting from detector and light source response times must be subtracted from the TOF measurements.

Let $S_r(t)$ be the response curve of the light source, e.g., a graphical plot of light source output when caused to pulse at time t0, and let P be the percent of light source light reflected from object 20. Let $D_r(f(t))$ be detection time of the detector amplifier as a function of f(t), where f(t) is a graphical plot of light shining on the sensor array as a function of time. Thus, $$f(t) = P \cdot S_r(t).$$

Once detector array 210 has achieved steady state operating temperature, amplifier and light source signal detection time will dependent only on P. If Z is the distance to the object, and C is the speed of light, total detection time as a function of P is given by:

$$T(P) = D_r(P \cdot S_r(t)) + Z/C$$

If a different response time for light source $S'_r(t)$ is used, total detection time is given by:

$$T'(P) = D_r(P \cdot S'_r(t)) + Z/C$$

The difference between the above two measurements yields:

$$\Delta T(P) = T(P) - T'(P) = D_r(P \cdot S_r(t)) - D_r(P \cdot S'_r(t))$$

Using calibration measurements made over a fixed known distance, one can construct a table of $\Delta T(P)$ vs. P, and $D_r(PS_r(t))$ vs. P. If $\Delta T(P)$ is monotonic in P, then it is possible from $\Delta T(P)$ to determine P using a reverse lookup table. This is generally be the case as $\Delta T(P)$ will usually decrease as P increases. From P one can obtain $D_r(P \cdot S_r(t))$ using another lookup table. Hence if $\Delta T(P)$ is monotonic in P, $D_r(P \cdot S_r(t))$ can be obtained from $\Delta T(P)$. To further streamline the lookup process, $D_r(P \cdot Sr(t)) = G(\Delta T(P))$ vs. $\Delta T(P)$ may also be directly obtained from calibration measurements and stored in table format, thus eliminating the intermediate P variable in the process.

From the above it follows that:

$$Z = C \cdot (T(P) - G(\Delta T(P)))$$

where T(P) and $\Delta T(P)$ are measured response times for a specific pixel. Note that T(P) and $\Delta T(P)$, which involves two measurements, are directly measured quantities, and hence it is not necessary to determine P.

In practice one might wish to choose $S'_r(t) = \frac{1}{2} S_r(t)$. For example, the first measurement pulse for T(P) may be illuminated with, say, two equal light sources, and T'(P) measured with one of the light sources being triggered. Other choices may instead be selected for S'(t). Any or all of the above-referenced lookup and reverse lookup tables may be stored in memory on IC 210, for example in memory 280.

FIG. 6A is an exemplary plot of T(P), T'(P) and ΔT(P) vs P. Delays T(P) and T'(P) are seen to increase with decreasing values of P, but their difference ΔT(P) also increases as P decreases. FIG. 6B is an exemplary plot showing T(P) vs. ΔT(P).

A potential problem with emitting a first high power pulse and a second lower power pulse to offset detection time is that the pixel detector response may be less than optimum when sensing the lower power pulse. Further, the need to take second pulse data can reduce the number of samples taken per frame. These problem may be overcome by measuring total amount of laser light falling upon each pixel. In essence, removing integration time from the detection time require knowledge of the integration time. Integration time is determined by examining total charge deposited on a pixel sensor responsive to an emitter pulse of laser light.

Thus, if the total deposited charge is say 3 mV for a 100 ns pulse width, and if the detector trip-point is say 0.5 mV, then the detection time is 16 ns (100 ns·(0.5/3)). Assume that a 1 ns tolerance on the charge at the pixel detector is to be detected with an accuracy of about 6%, which implies voltage measurement resolution of about 180 $\mu$V. This in turn suggests that the amount of charge should be boosted substantially before attempting to make accurate measurements. This is achieved by allowing charge to accumulate on the pixel detector over several pulses of the emitted light source, for example, taking 100 measurements per frame. After say three frames, the accumulated voltage will be on the order of 900 mV. An 8-bit analog-to-digital converter can measure such voltage to a resolution of about 1%, from which measurement knowledge of the voltage trip-point for each pixel amplifier and thus the integration time is ascertainable.

As noted, counters 310 require a very high-speed CLOCK signal having cycle time on the order of 100 ps, which CLOCK signal must be available at each pixel detector in array 210. Assuming system 200 is fabricated on an IC chip having dimensions 1 cm×1 cm, at least 70 ps (e.g., 1 cm/C) will be required solely for the clock signal traverse one side of the chip to the other. Distribution of a clock with 100 ps cycle time may be and remain beyond the capabilities of standard clock distribution techniques, where the clock pulse will propagate to each pixel during a clock cycle.

Any method that provides a high-speed CLOCK to each pixel detector in the array will suffice, as clock skew between pixels is unimportant in that there is no signal communication between pixel detectors. However, each pixel detector in the array must have access to the high-speed clock, which appears to exclude use of relatively expensive phase lock loop type local high-speed clock regeneration schemes, since ten thousand or so such regenerators would be required.

In a preferred embodiment of the invention of the parent application, an efficient high-speed clock distribution system is implemented that uses a post-processing step based on pixel location in the array. This post-processing is carried out once detected light has been sampled, and can compensate for differences between arrival times of the CLOCK signal at the various pixels in the array. As noted, clock cycle time is on the order of a few inverter delays, yet the clock tree may have more levels of logic from the clock root to each pixel. However since clock skew between the pixels is relatively unimportant, different delays from the clock root to the pixels are acceptable. Indeed, even the logic height (in terms of number of inverters) for the clock tree may differ for different pixels.

In a standard clock distribution system, one clock signal has sufficient time to completely propagate from the root to the pixels before the next clock phase begins. However in the invention under discussion such is not the case, since cycle time is on the order of an inverter delay, and there may be a large number of inverters from the clock root to a pixel.

In the parent application invention, cycle time constraint preferably is met by generating a falling clock edge at clock root before the preceding rising clock edge has arrived at all the pixels. Thus the root of the clock tree may be operating on one clock phase, while leaves of the clock tree may still be operating on the previous clock phases or cycles.

Each clock cycle may be regarded as a pulse traveling from the clock root to the leaves, where at any given time the clock tree may have several such waves traveling simultaneously from root to leaves. However, depending upon parasitic capacitance and device sizes, rising edges and falling edges of a wave may travel at slightly different speeds through the clock tree. As a result, after a few levels of logic the back of the wave may catch up with the front of the wave. When this occurs, the wave will disappear and the clock pulse will not propagate to the sensor pixels downstream. This phenomena is particularly pronounced when the wave pulses are very narrow, which is the case when the clock cycle times are extremely short.

Figure 7:
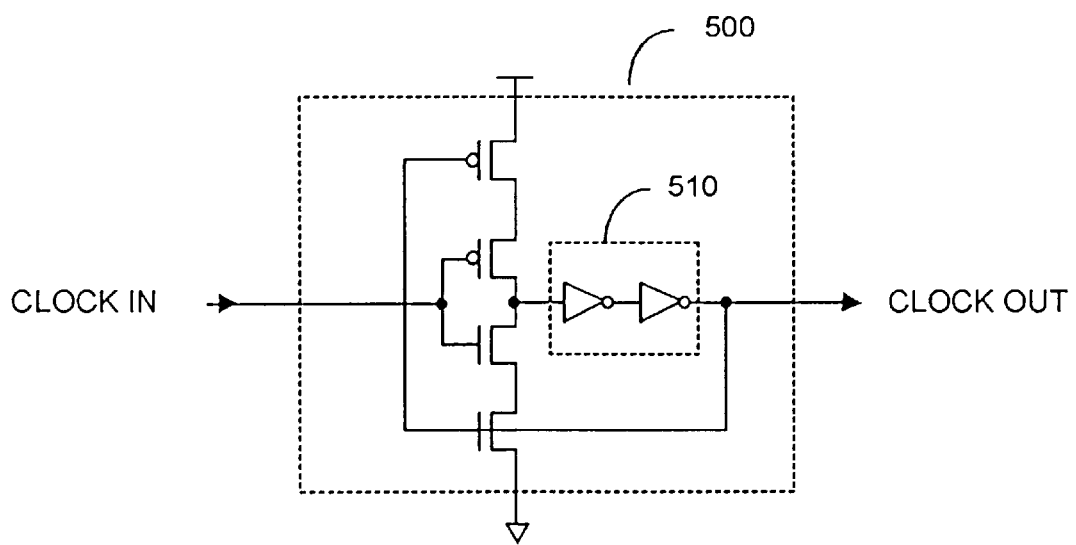
FIG. 7 depicts a preferred embodiment of a clock pulse width restorer, according to an embodiment of the invention described in the parent application.

FIG. 7 depicts a preferred embodiment of a clock pulse width restorer 500 that prevents such wave disappearance. Circuit 500 prevents a rising (respectively falling) clock edge from propagating to the circuit output until a falling (respectively rising) clock edge is detected at the circuit input. This ensures that rising (respectively falling) edges and falling (respectively rising) edges are separated by at least a delay d corresponding to the delay created by circuit 500. Clock pulse width may be controlled by adding or deleting a buffer segment. Although FIG. 7 depicts a single buffer segment 510 comprising two serial-coupled inverters, more or fewer buffer segments may be used to adjust the pulse width.

Referring now to FIG. 2, on-chip processor 260 and/or associated memory 270 may be used to decode PRSC number sequences to actual elapsed time values. Processor 260 may also perform detector delay removal and pixel location based clock skew correction, and can also average multiple samples to reduce the detection time standard error.

As noted above, it can be challenging to provide acceptably fast CLOCK signals and high speed counters in the first embodiment of the invention described in the parent application. Accordingly, a second embodiment is provided in which the clock circuit and high speed counters are eliminated.

Figure 8:
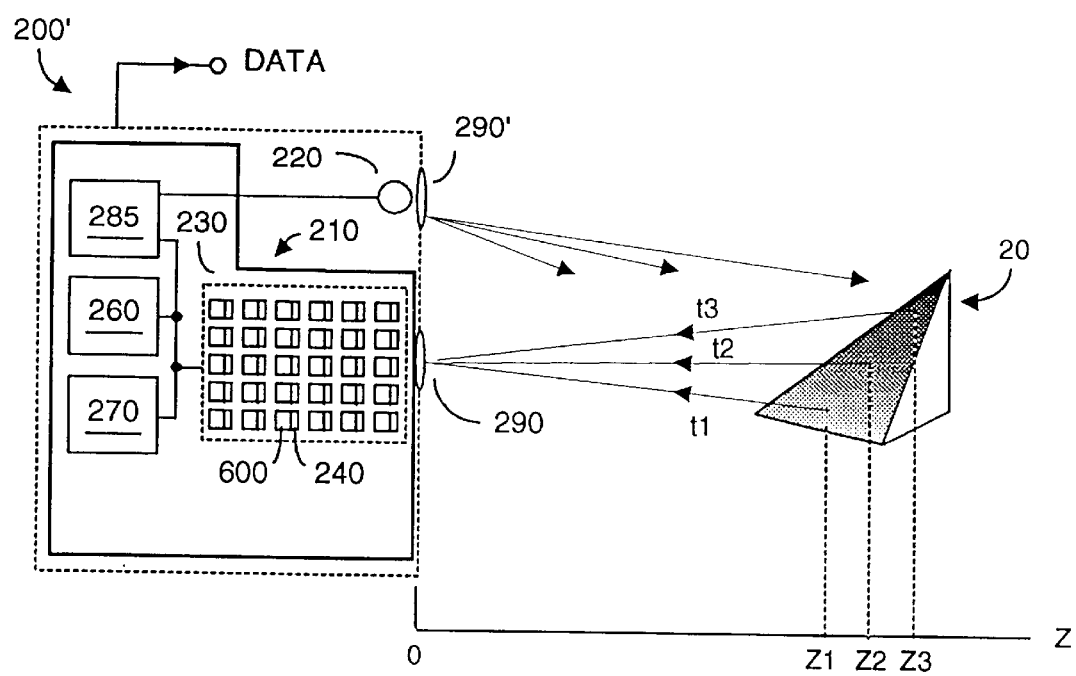
FIG. 8 is a diagram showing an a three-dimensional imaging system implemented on a single IC, according to a second embodiment of the invention described in the parent application.

The second preferred embodiment is shown in FIG. 8, wherein system 200' includes a two-dimensional array 230 of pixel detectors 240, each pixel detector having an associated shutter and charge accumulator or integrator circuit 600. Components in FIG. 8 having like reference numerals to what was shown in FIG. 2 may be identical components to what has been described. Thus 210 is a single IC containing array 230, microprocessor or controller 260, memory unit 270, and input/output interface circuitry 285. As described with respect to system 200 shown in FIG. 2, a light source 220 emits light pulses through an optional lens 290', and reflecting light returning from an object 20 passes through a lens and filter 290, to fall upon pixels 240 in array 230.

Figure 9:
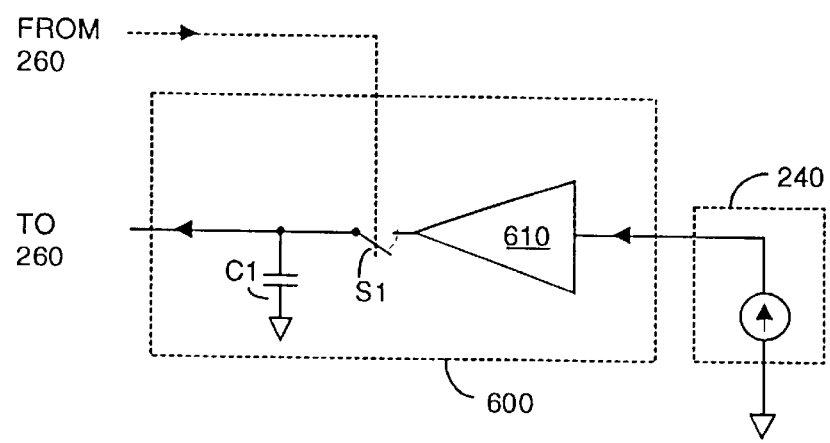
FIG. 9 is block diagram showing an individual pixel detector with associated shutter switch and pulse integrator, according to a second embodiment of the invention described in the parent application.

FIG. 9 depicts a preferred embodiment of circuitry 600 associated with each pixel detector 240. Within circuitry 600, the output of each pixel detector is coupled to an amplifier 610 whose output is coupled via an open (current passing) or closed (current-blocking) shutter S1 to a charge accumulator or integrator, shown here symbolically as a capacitor C1. Shutter S1 preferably is a high speed electronic switch, but may be an opto-mechanical shutter such as a ferro-electric material whose opaqueness may be rapidly altered in response to electronic control signals.

Indeed, an electronic shutter may be constructed using a controlled source such as a current-controlled current source. A pixel detector will produce a current $I_s$ proportional to the number of received photons, which may be mirrored with a current-controlled current source to produce current $I_m$, where $I_m = K \cdot I_s$, where K is a constant. Rather than directly measure pixel detector charge, charge on capacitor C1 is measured. The shutter may be closed by turning-off the current-controlled current source such that $I_m = 0$, in which case current $I_s$ no longer affects capacitor C1.

Any incoming light photons falling upon detector 240 will produce a current that is amplified by unit 610. As long as shutter S1 is open, the amplified charge-detected pixel output from unit 610 will charge capacitor C1. Conversely, when shutter S1 is closed (as shown in FIG. 9), no additional charge from unit 610 is received by charge accumulator or integrator C1.

Thus, for an object relatively near the pixel detector, substantially all of the light pulse generated photons from the object surface can reach the detector before the shutter closes. However, for a relatively distant object, photons resulting from the end of the light source pulse may not have sufficient time to reach the sensor before the shutter closes and hence will be discarded. By calculating the fraction of photons from the pulse that are blocked by the shutter, distance to the object can be computed.

As described earlier, controller or processor 260 causes circuit 285 to drive light source 220 to emit a pulse of light at time t0. However at or before time t0, controller 260 causes each charge integrator C1 to discharge any charge, and then opens the associated shutter S1. In response to being illuminated with the emitted light pulse, different portions of the surface of object 20 reflect light back towards system 200'.

Eventually pixels focused upon the nearest surface of object 20 (e.g., at distance Z1 in FIG. 8) begin to detect incoming photons. The current charge from these pixels is amplified by amplifier 610 and charges, via the open shutter S1, capacitor C1. As long as S1 is open C1 will continue to accumulate charge. After a while, pixels focused upon slightly further object distances begin to detect incoming photons, and begin to accumulate charge on their own accumulator C1, via their individual amplifier and shutter.

Note that integrators C1 associated with pixels focused on nearer object surfaces begin to integrate charge sooner in time than other integrators, and thus can accumulate more charge per unit time. After a time approximating the emitted light pulse width, controller 260 causes all shutters to close, preferably simultaneously. At this point, the accumulated charge on each accumulator C1 is static, or frozen. If desired, some or all of the shutters may be opened in any desired sequence, including randomly, rather than simultaneously.

It is seen that the accumulated charge magnitude for each C1 for each pixel provides direct roundtrip TOF data to the object point upon which such pixel is focused, e.g.:

$$i_1 = C1 \cdot (\Delta V / \Delta t)$$

where $i_1$ is current output by a pixel detector, C1 is the associated current integrator, $\Delta V$ is the signal change across C1 resulting from accumulated charge current, and $\Delta t$ is the time over which the charge is accumulated.

Preferably one set of data is collected with all shutters remaining open for perhaps the period of the emitted light pulse train frequency. Charge gathered during this data set represents point-by-point reflected luminosity for the object surface. Such charge permits correcting for errors caused by more distant but more reflective object surface portion. For $TOF \geq 0$, the underlying relationship is given by:

$$TOF = [(Vcs - Vos)/Vcs] \cdot PW + Tep - Ts$$

where Vcs is the signal resulting from the continuously open shutter, Vos is the signal resulting from a shutter opened for substantially the light pulse width duration, Tep is time of pulse end, Ts is time shutter closed, and PW is the time duration of the light pulse width.

If a shutter remained open, the total number of photons falling on a pixel detector is given by $$N_o = K \cdot PW$$

where K is a constant that depends on the illumination intensity of the object, object reflectivity, and lens aperture. If $Ts - (t_0 + 2Z/C) < PW$, the shutter will clip the tail-end of the reflected light pulse energy, and the number of effective photons received by the pixel detector will become:

$$N_s = K \cdot (T_s - t_0 - 2Z/C)$$

from which distance Z is obtained as:

$$Z = C/2 \cdot (N_s \cdot PW/N_o + t_0 T_s)$$

The accuracy of this method depends on how accurately Ns can be measured. Both $N_s$ and $N_0$ are measured by measuring the resulting charge on the sensor, for example using an A/D converter. Using a laser light source power of about 10 W, a 1 cm distance difference can result in variation $\Delta N_s$ of $N_s$ of about a hundred photons. To boost the accuracy multiple pulses in a cumulative fashion can be performed.

Using this technique, the light source is pulsed repeatedly without clearing charge on the sensor between pulses. The charge on the sensor is thus the cumulative charge produced by all the reflected light pulses for which photo energy is detected. The cumulative charge is proportional to the cumulative number of effective photons summed over the number (n) of all pulses. By way of example, charge difference for a 1 cm distance change will be $n \cdot \Delta N_s$, which for $n=100$ results a charge difference $n \cdot \Delta N_s$ on the order of tens of thousands of photons.

Comparing the first and second embodiments of the parent application invention, in the first embodiment it is relatively easy to detect the onset of a relatively long-lasting and late arriving amount of photon energy. However in the second embodiment, pulse width PW is typically on the order of 100 ns, and Vcs is about 2 mV, and for 1 cm resolution, variation in TOF will be about 100 ps. In this example, variation of (Vcs−Vos) will be on the order of about 2 $\mu V$ (2 mV/100 ns·0.1 ns). A 2 $\mu V$ variation represents detection of a relatively few electrons and will generally be unresolvable with conventional A/D converters.

Nonetheless, the magnitude of voltage variation of (Vcs−Vos) may be enhanced by emitting multiple light pulses and allowing the photon energy to accumulate or build-up repeatedly on the charge integrators. Thus, if 200 light pulses were emitted per measurement, the variation voltage to be resolved would be on the order of 400 μV, which magnitude is resolvable with conventional A/D converters. Since the noise component of the accumulated charge build-up is random, the S/N ratio can be substantially enhanced.

The various embodiments of the invention described in the parent application, and to be described herein, advantageously can be fabricated with processor 260 on the same IC chip containing the detector array and associated electronics. Processor 260 can access and store in RAM memory portion 270 consecutive acquired image frames. The processor can compare successive frames acquired by the sensor array at close time intervals to compute the velocity field of the image at each pixel, since each frame contains distance values for each pixel. The velocity field at a pixel in the direction normal to the array can be easily computed as follows:

$$V_z = (d_{n+1} - d_n)/\text{FrameRate}$$

where $(d_{n+1} - d_n)$ is the difference in distance measurements between two consecutive frames. The velocity field in the two other dimensions can be calculated by first identifying the contours of the different planes in the image, where each plane corresponds to an object that occludes its background. Object contours will manifest as discontinuities in the distance from target to the sensor array. By identifying the contours, pixel-detected objects in pixels corresponding to same object (e.g., a person's head) may be identified as they are all within the same contour.

Movement of objects within a contour is computed by identifying contour movements between frames. The pixels within the contour can all receive a uniform velocity, which is the velocity of the contour. Since objects can be identified using their contours, one can track objects of interest using the on-chip processor. Thus, the IC chip can export a single value (DATA) to represent change in location of the entire object whenever it has moved. Thus instead of exporting from the IC chip an entire frame of pixels at the frame rate, a single vector representing the change in location of the object of interest may instead be sent. So doing results in a tremendous reduction in chip input/output and can greatly reduce off-chip data processing requirements.

Having described various embodiments of the inventions set forth in the parent application, the present invention will now be described, primarily with reference to FIGS. 10–14. As noted, the invention now to be described does not rely upon high speed counters or shutter mechanisms.

Figure 10:
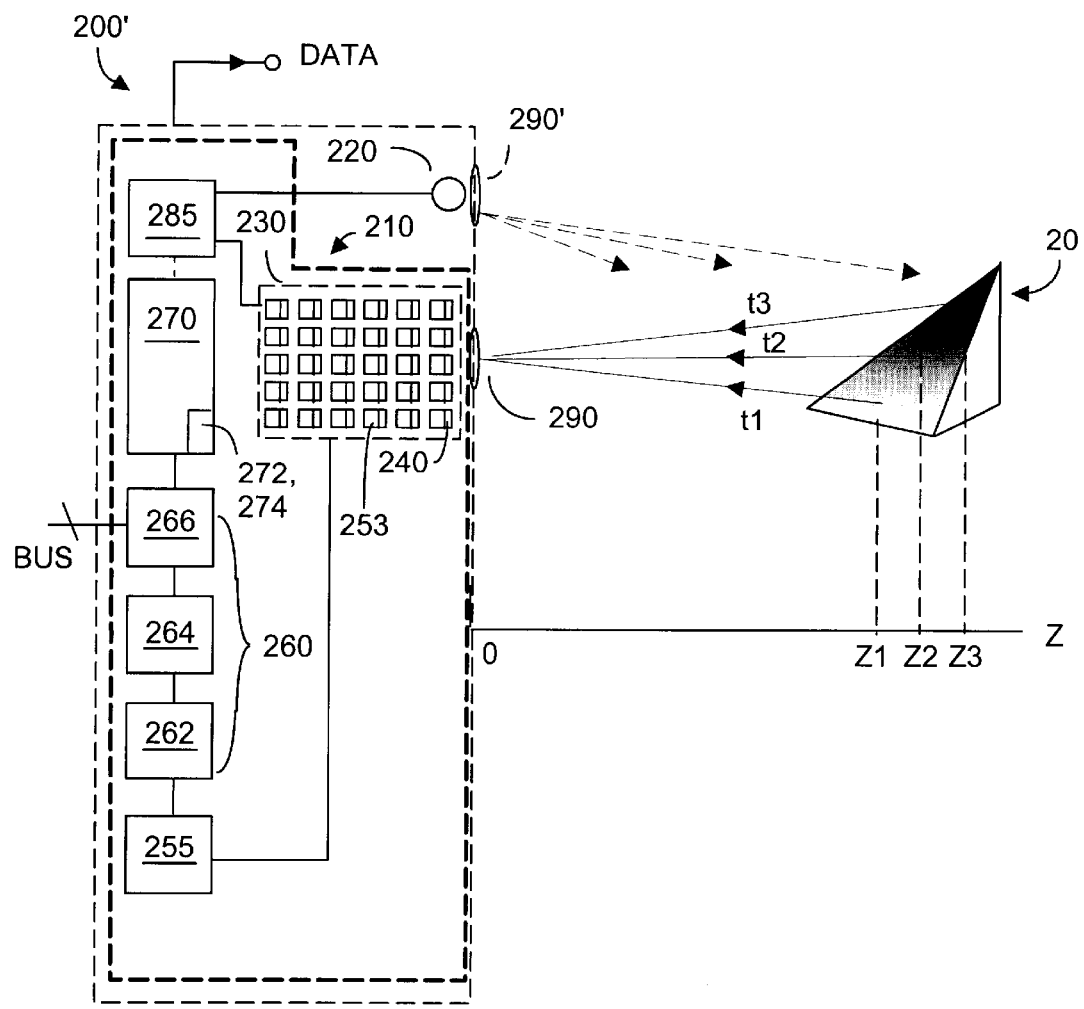
FIG. 10 is a diagram showing an a three-dimensional imaging system implemented on a single IC, according to a preferred embodiment of the present invention.

FIG. 10 is a block diagram depicting the present invention 200', a three-dimensional imaging system that preferably is fabricated on a single IC 210. The system requires no moving parts and relatively few off-chip components, primarily an energy emitter 220, e.g., a light emitting diode (LED) or laser source and associated optical focusing system, e.g., lenses 290, 290'. Indeed if suitable shielding were provided, one might bond laser source 220 onto the common substrate upon which IC 210 is fabricated. Unless otherwise noted, element values that were used to describe various of FIGS. 2–9 may refer to similar components in invention 200'.

System 200' includes an array 230 of pixel detectors 240, each of which has dedicated circuitry 253 (see FIG. 12 for detail) for processing detection charge output by the associated detector. In a typical application, array 230 might include 100×100 pixels 230, and thus include 100×100 processing circuits 253. Sensor interface circuitry 255 provides any required interface transformations. Preferably IC 210 also includes a microprocessor or microcontroller unit or sub-system 260 that preferably includes a control processor 262, a data processor 264, and an input/output processor 266. IC 210 preferably further includes memory 270 (which preferably includes random access memory or RAM 272 and read-only memory or ROM 274), and various timing and voltage reference support circuitry 285.

Among other functions, controller unit 260 may perform distance to object and object velocity calculations. Preferably the two-dimensional array 230 of pixel sensing detectors is fabricated using standard commercial silicon technology, which advantageously permits fabricating circuits 250, 255, 260 (262, 264, 266), 270, and 285 on the same IC 210. Understandably, the ability to fabricate such circuits on the same IC with the array of pixel detectors can shorten processing and delay times, due to shorter signal paths.

In conjunction with support circuitry 285, the sensor array 230 will acquire data representing incoming energy, preferably returned from a target object 20. Control processor 262 controls the various sequences of reset cycles and data acquisition cycles, based upon operating requirements provided by data processor 264. Control processor 262 further decodes data output from sensor array 230 and interfaces with the array, preferably via circuitry 285. Advantageously control processor 262 can act to hide the specific details of reset and acquisition sequences that are required to meet the needs of data processor 264. Data processor 264 interprets decoded sensor data, and can request control processor 262 to modify data acquisition parameters. It will be appreciated that the system described advantageously is flexible in operation, and can modify itself to meet present modes of operation. Finally, input/output processor 266 can export interpreted data to other circuitry, including an external host.

Each photodiode in a pixel detector 240 may be represented as a parallel combination of a current source, an ideal diode, and shunt impedance and noise current source. Each pixel detector (as that term has been broadly defined herein) outputs current proportional to the amount of incoming photon light energy falling upon it. As noted, preferably CMOS fabrication is used to implement the array of CMOS pixel diodes or photogate detector devices. For example photodiodes may be fabricated using a diffusion-to-well, or a well-to-substrate junction. Well-to-substrate photodiodes are more sensitive to infrared (IR) light, exhibit less capacitance, and are thus preferred.

Within array 230, each preferably identical detector 240 can generate data from which Z distance to the target object 20 can be determined. In the preferred embodiment, each pixel detector simultaneously acquires two types of data that are used to determine Z distance. The two types of data acquired are (a) delay data, and (b) pulse brightness data. Delay data is the time required for energy emitted from emitter 220 to travel at the speed of light from emitter 220 to target object 20 and back to sensor array 230, and to be sensed within array 230 sufficiently long to build-up a sufficient signal level at the recipient pixel sensor. Brightness is the total amount of signal generated by detected pulses received by sensor 230.

Figure 11A:
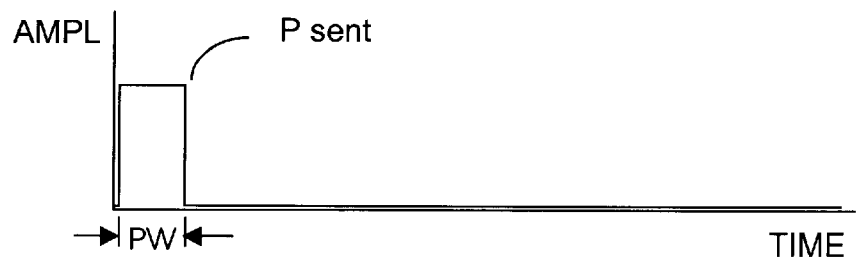
FIGS. 11A–11C depict signal waveforms at various locations in the system of FIG. 10, according to the present invention.
Figure 11B:
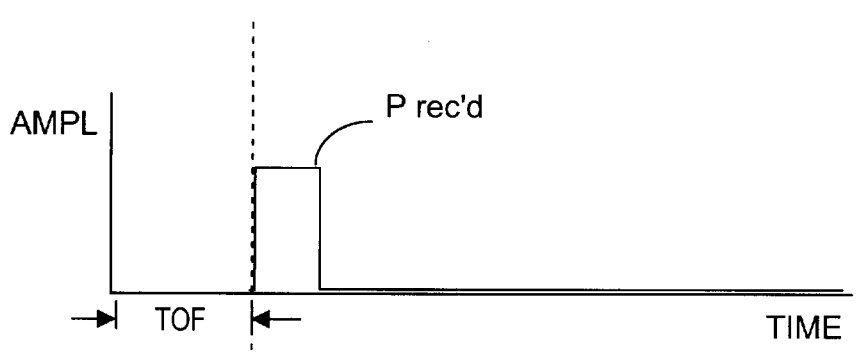

Signals associated with the two types of data acquired by pixel detectors will now be described with reference to FIGS. 11A–11C. FIG. 11A depicts an emitted pulse (Psent) with a pulse width PW, as being output by energy emitter 220, preferably via lens system 290'. For a laser light emitter 220, an exemplary value of PW might be 20 ns, although other widths could of course be used. Emitted pulse Psent traverses the Z-distance to object target 20 and a fraction of the emitted energy is reflected back toward system 200', and is focused by lens 290 upon preferably smart pixel array 230. The received energy pulse, Prec'd, is detected by array 230. The roundtrip time-of-flight (TOF) taken for the pulse emitted in FIG. 11A to be reflected by object 20 and be detected by a photodiode in array 230 as shown in FIG. 11B is denoted TOF. The delay or transit time denoted by TOF will be given by C/2Z, where C is the velocity of light, and Z is the distance from array 230 to target object 20.

It is understood that the waveforms shown in FIGS. 11A and 11B are somewhat idealized. As described herein, the detected Prec'd pulse is integrated by circuitry associated with the relevant smart pixel detecting the pulse. As shown by FIG. 11C in the ideal case, integrating the detected signal pulse produces a ramp-like signal that eventually attains a desired threshold voltage magnitude Xref.

Figure 11C:
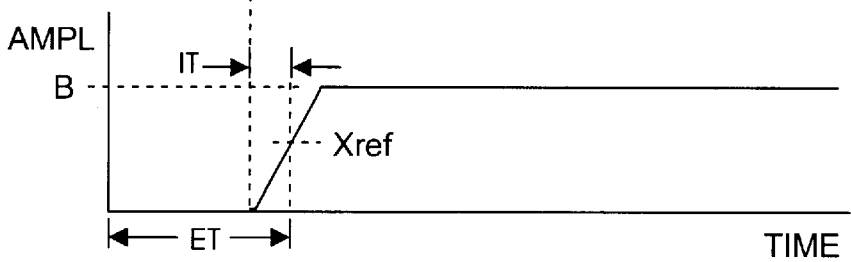

In the preferred embodiment, detection of received energy occurs when the integrated return pulse signal shown in FIG. 11C at least attains a threshold magnitude Xref. The integration time (IT) required to build up and attain the threshold magnitude Xref is proportional to Xref·(dt/dV) where dV/dt is the slope of the ramp-like signal shown in FIG. 11C. Thus, the elapsed time (ET) from onset of firing of energy emitter 220 (start of pulse Psent in FIG. 11A) to onset of detection of pulse Prec'd (as shown in FIG. 11B) is given by:

$$ET=IT+TOF$$

Calculation of TOF given ET involves removing the integration time IT. But IT may be calculated if the slope of the function shown in FIG. 11C is known, and according to the present invention, the slope may be determined using detected brightness information. As used herein, brightness represents the integrated signal value (e.g., shown in FIG. 11C) after the contribution from the entire pulse (e.g., all of PW) has been integrated. Circuitry associated with IC 210, upon which IC much of the present invention may be fabricated, measures brightness, referred to herein as B. Since the pulse time (e.g., PT) of the energy emitter 220 is known, in the ideal case the slope of the signal shown in FIG. 11C is given by B/PT. Thus, TOF may be calculated given brightness (B) and elapsed time (ET) information.

Each pixel photodiode sensor 240 includes circuitry 253 (see FIG. 12) permitting the pixel to measure both delay data and pulse brightness data. In practice, data acquisition rates are so high (e.g., 3 K/sec) that, due to circuit bandwidth constraints, transferring all acquired data from the pixel array to the interface circuitry 255 may simply not be feasible. Thus, it is preferred that circuitry associated with circuits 253 permit sensed data to be accumulated and at least partially processed with the pixel before being sent to sensor interface circuitry 255. The use of an array 230 of such smart pixels advantageously reduces the effective bandwidth requirements for other circuits associated with IC 210.

Sensor array 230 can acquire data at an externally visible frame rate of perhaps 30 frames/second. The accuracy of each frame of acquired data is enhanced by carrying out perhaps N=100 measurement samples (e.g., Psent pulses transmitted from emitter 220) within the frame. The time delay uncertainty of each acquired data sample is reduced by √N, where N is the number of samples, and thus increasing the number of samples decreases the time delay uncertainty. As noted, each pixel detector also provides brightness information. Brightness is measured using the same pixel collected charge that is used in delay data measurements. However since the charge output by each pixel is typically rather small, charge is preferably accumulated over many samples before used to provide an accurate brightness measurement.

Figure 12:
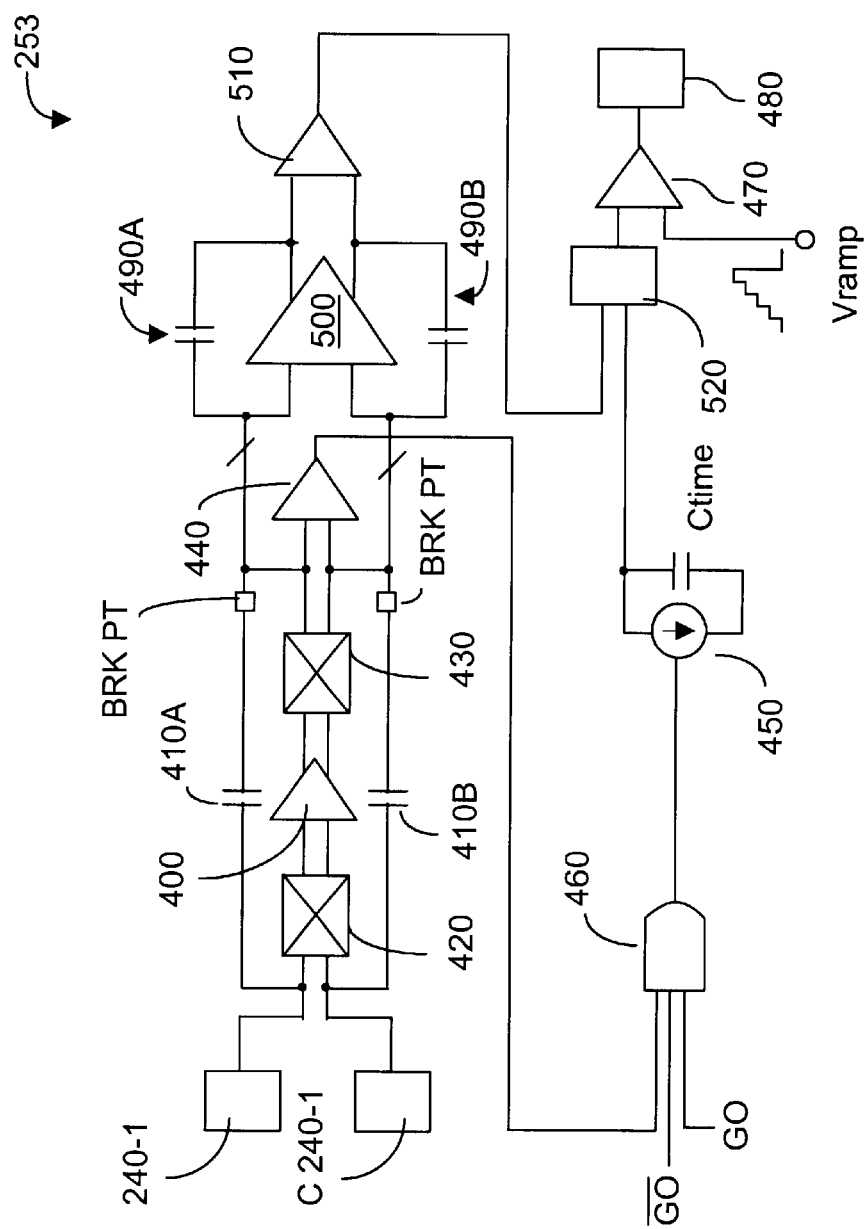
FIG. 12 is a block diagram showing a preferred differential implementation of pixel detector circuitry, according to the present invention.

FIG. 12 is a more detailed block diagram of pixel circuitry 253, showing the preferred differential configuration used to reduce the undesired effects of noise (external and intrinsic) upon the individual pixels 240 in array 230. Those skilled in the art of low signal circuit design will appreciate that external noise will equally affects both lines of a differential signal, and thus tend to self-cancel. Applicants have found that the use of a differential circuit configuration as shown in FIG. 12 can cancel, at least to the first order, charge injection noise due to internal switching elements.

At the upper left corner of FIG. 12, a pixel 240-1 within array 230 receives reflected photon energy via lens 290 and converts the visible or infrared incoming energy into an electrical current. To promote conversion efficiency, it is preferred that pixel photodiodes such as 240-N be fabricated from a well to substrate diode, where N is an integer. A matching capacitor C 240-1 is provided having the same capacitance magnitude as pixel photodiode 240-1, to promote fully differential operation. The magnitude of capacitor C 240-1 will be carefully matched to the capacitance of photodiode 240-1, within a tolerance of about ±1%. Preferably each capacitor 240-N is fabricated as a MOS gate-to-source drain transistor capacitor, which advantageously allows fine-tuning of the C240-N capacitance magnitude by varying a gate-to-source voltage. In this fashion, matching capacitors 240-N may be fine-tuned after the circuitry shown in FIG. 12 is fabricated.

A very low thermal noise differential operational amplifier 400 amplifies the current signal present from pixel photodetector 240-1. Current generated by photodetector 240-1 is accumulated, and the accumulated current converted to a voltage that is present across matching capacitors 410A, 410B. In essence, amplifier 400 and capacitors 410A, 410B act as a differential integrator that converts photodiode generated current to voltage. (See FIG. 11C.) It will be appreciated that good circuit design is mandated for amplifier 400 to minimize the effects of noise, which effects would degrade measurement accuracy.

The circuitry shown in FIG. 12 is initialized under control of microprocessor system 260 such that charge across matched capacitors 410A, 410B is zeroed-out before each measurement. The zeroing-out is accomplished using offset cancellation techniques that also reduce offset uncertainty due to KT/C. For example, in the configuration of FIG. 12, the KT/C error offset at the input of amplifier 400 will be reduced by the closed-loop gain of the amplifier configuration. Total thermal noise present at the output of amplifier 400 is reduced by keeping the intrinsic input referred noise to a minimum (perhaps about 3 nV/√(Hz)), and by limiting amplifier 400 bandwidth, perhaps to about 5 MHz.

Chopper units 420 and 430 are placed in the signal path to reduced the effects of circuit mismatching, and to reduce so-called 1/f noise. The chopper units invert the two signals present at their inputs, and do not otherwise change the functionality of the circuitry shown. However this inversion inverts the effects of offset due to signal mismatch, and is known to reduce 1/f noise.

For ease of illustration, circuit 253 in FIG. 12 does not depict various switches and breaker points, two of which are denoted generically.

A Schmitt trigger 440 receives the differential output from amplifier 400. When the amplifier 400 output signal attains sufficient magnitude, trigger 400 will trip or change state, quickly producing a high "stop" voltage signal at its output. The use of Schmitt trigger 440 provides noise immunity by reducing false trips until the amplifier 400 output signal reaches a predetermined value. Further, the high gain bandwidth associated with trigger circuit 440 produces a stable output signal faster than would be possible if circuit 400 were a regular amplifier. Offset cancellation circuitry in Schmitt trigger 440 further reduces the input referred KT/C offset to within tens of microvolts. Thus, the overall input-referred KT/C offset (referred to the input of amplifier 400 is divided by the gain of amplifier 400 and by the gain of Schmitt trigger 440. The input-referred thermal noise, e.g., referred to the input of amplifier 400, is divided by the gain of amplifier 400, and will not have substantial magnitude. Indeed, substantially all noise generated downstream from the output of amplifier 400 is divided at least by the gain of amplifier 400, and is not significant in magnitude.

Those skilled in the art will appreciate that within pixel photodetector 240-N, shot noise from electron pairs will exist. The trip point of Schmitt trigger 440 is made as small as possible to reduce this shot noise. In practice, applicants have found that the Schmidt trigger circuit can be tripped by pixel photodetector 240-N creating about 100 electrons. False tripping is reduced, preferably by providing Schmitt trigger 440 with a programmable dead band that allows the trip point and the amount of hysteresis to be controlled at run time. As such, the overall sensor system used in the present invention can be calibrated for maximum sensitivity and reliability at run time.

As noted, elapsed time (ET) corresponds to TOF of light to the object target 30 and back to system 200', plus the time required for the return signal being detected to build-up in amplitude to a magnitude sufficient to trip Schmitt trigger 440. Referring still to FIG. 12, a timing capacitor Ctime is used to measure elapsed time (ET) between a GO pulse or "START" signal and a "stop" signal associated with Schmitt trigger 440. The GO pulse or START signal is generated by input/output (I/O) support circuitry 285 (see FIG. 10) and is coupled simultaneously to each pixel 240 in array 230. Discharge of Ctime begins upon receipt of the go pulse or START signal, and discharge ceases when the Schmitt trigger trips. The amount of voltage discharged ($\Delta V$) by the capacitor will be proportional to ET. The magnitude of capacitor Ctime is selected such that voltage error resulting from KT/C reset noise is acceptably small. In practice, the GO signal is programmably delayed from the START signal by a time ranging from perhaps 10 ns to about 20 ns.

A current mirror 450 is provided to keep the Ctime discharge rate constant, and to avoid charge injection when discharge of Ctime is being turned-on or turned-off. In the preferred embodiment, charge injection is reduced by turning-on and turning-off a transistor that is responsible for current sinking, with gate voltage swings on this transistor being kept to a minimum. Alternatively one might simply interrupt current flow to or from Ctime directly, but so doing would typically generate a large current spike during transistor switching. The discharge rate of current mirror 450 is preferably programmable, which allows Ctime to be discharged rapidly (e.g., perhaps about 5 ns for a complete discharge), to accurately measure a rapid system event, perhaps measurement of a short Z-range distance. Alternatively, current mirror 450 can be programmed to cause Ctime to discharge more slowly (perhaps 25 ns for a complete discharge), to increase dynamic range. A transistor control voltage is coupled to each pixel 240-N in array 230 to control rate of discharge of the Ctime capacitor associated with each pixel.

A preferably differential NAND gate 460 control setup to current mirror 450 by outputting a first signal (e.g., "1") when a GO pulse is turned-on until Schmitt trigger 440 trips. NAND gate 460 provides a single-ended NAND of the differential GO pulse signals and the trigger stop signal from Schmitt trigger 440. To reduce charge injection effects into the substrate of IC 210, it is preferred that the differential GO pulse signal have a reduced voltage swing, e.g., about 100 mV. Thus, NAND gate 460 also serves to amplify the GO pulse signal.

The GO or START pulse will arrive close in time to when detection of the signal at a photodiode 240-N occurs. The GO or START pulse is distributed globally within system 200', and it is important that this signal not inadvertently trip pixels 240-N. Accordingly, it is preferred that a differential GO pulse driver and distribution sub-system be provided to distribute a low voltage magnitude swing differential GO pulse signal to each pixel in array 230. Ideally the voltage signal swings on each differential line will be substantially symmetrical, which advantageously causes charge injected by the positive differential line, and charge injected by the negative differential line to cancel almost exactly. Charge injection effects may be further reduced by shielding the distribution line carrying the differential GO signals. The differential GO signals may be generated with the GO pulse generator 580 (see FIG. 13).

The analog discharge voltage $\Delta V$ appearing on timing capacitor Ctime is converted to a digital voltage value using a second Schmitt trigger 470 and associated counter. The associated counter may be similar to counter 480 shown in FIG. 12, although the associated counter may not be implemented using delay flipflops (DFFs). It will be appreciated that counter 480 need not be a high speed counter. Schmitt trigger 470 compares the voltage generated across timing capacitor Ctime with a ramp signal (Vramp) generated externally to array 230. (Generation of Vramp is described with respect to FIG. 13.) When magnitude of Vramp exceeds the voltage across Ctime, Schmitt trigger 470 will trip. The Vramp signal is actually a stair-step signal that is incremented in value in small increments in lockstep with a clock signal used within system 200'. At each clock cycle, Vramp is increased or decreased in magnitude by a small voltage, perhaps about 3 mV. Advantageously the increment/decrement level used in generating Vramp is programmably controllable by system 200'. For example, higher accuracy distance resolution is required, finer increment/decrement steps for Vramp may be used, although conversion time will be lengthened due to the additional increment steps.

Counter 480 is initially reset to zero, and counts the number of steps in the Vramp signal before Schmitt trigger 470 trips. Preferably for each clock cycle, the contents of counter 480 is incremented by a count of one in lock step with the steps of the Vramp. When Schmitt trigger 470 trips, counter 480 is caused to cease counting such that the final count value represents the digital value of the conversion of the analog voltage signal appearing across timing capacitor Ctime. As such, the digital value of the contents of counter 480 is a directly measured value for elapsed time (ET). In an actual system, each pixel detector may have a delay offset that depends in part upon propagation time of the GO pulse to that pixel, and that depends upon process variations. Such delay offsets can result in errors somewhat akin to fixed pattern noise in CMOS imagers. Applicants have found that this fixed counter pattern noise may be reduced by preloading counters 480 with a specific offset count associated with the corresponding pixel, thereby reducing the effect of system offset.

In the preferred embodiment, rather than attempting to read-out and process such enormous amounts of information, it is preferred that samples acquired for each frame are averaged within each smart pixel. In practice, the number bits required for each conversion is perhaps 8 bits to 10 bits. Applicants have chosen to use larger counters, perhaps 15-bit counters, rather than use 8-bit or 10-bit counters. So doing permits successive samples to be averaged within the counters by resetting the counters once at the beginning of each frame and by not resetting the counters for each pulse. This method causes the digital value for each pulse to be automatically added to the value already held within the counter. At the end of a frame, the counter value will be the sum of all the analog-to-digitally converted samples in the frame. It is understood that the spread spectrum nature of such counters means one cannot really distinguish high-order counter bits from low-order counter bits.

By way of example, assume that each frame has 128 samples (7-bits), and that each sample results in an 8-bit analog-to-digital value being added to a counter value. The sum results may safely be stored within the range of a 15-bit counter, and the high 8-bits of the counter will contain the average value of the 128 samples.

As noted, in the present invention, analog time delay is converted into a digital value that is added to the digital contents of an associated counter. Next, brightness is also calculated to remove the effects of integration time. In practice, complete analog-to-digital high-resolution conversation of the pixel output signal (e.g., brightness) from a single detected pulse (Prec'd) is not readily feasible due to the poor signal/noise ratio. As shown by FIG. 12, in the preferred implementation, rather than convert pulses into digital values per se, the electrical charge associated with a detected pulse is accumulated into accumulation capacitors 490A, 490B associated with differential accumulation amplifier 500. Capacitors 490A, 490B are reset at the beginning of each frame, and the detected signal charge integrated in capacitors 410A, 410B is dumped or transferred into accumulation capacitors 490A, 490B at the end of each pulse. Accumulation amplifier 500 is a high gain amplifier used in a closed feedback loop configuration to ensure proper charge dump or transfer, despite voltage levels that may already be present in capacitors 490A, 490B.

After accumulating charge from sufficient, perhaps all, detected pulses in a frame, capacitors 490A, 490B will retain sufficient charge and voltage to permit acceptably accurate analog-to-digital conversion. Note that to avoid overflow, fewer pulses than are present in an entire frame may be accumulated in capacitors 490A, 490B. In practice, after about one-hundred detected pulses have been received, the accumulated TOF is stored, for example in a buffer in memory 280 in FIG. 10.

Analog-to-digital conversion of accumulated brightness information may be carried out similar to what has been described in digitizing the acquired time delay information. A track and hold unit 510 converts the differential signal output from amplifier 500 into a single-ended signal, which signal is compared by Schmitt trigger 470 to the Vramp signal. Counter 480 counts the number of incremental steps in the Vramp signal required for the Vramp magnitude to equal the single-ended voltage magnitude. A multiplexer unit 520 selects either this single-ended voltage signal, or the voltage present across timing capacitor Ctime for analog-to-digital conversion. Note that by judicious scheduling of the analog-to-digital conversions, the same Schmitt trigger and counter may be used to digitize both time delay information and brightness information. Note that offset values may also be stored into counters to compensate for fixed pattern brightness noise.

At each pulse the time delay analog-to-digital conversion is performed and the digital result added to the digital counter value, and the pulse brightness value is added to the charge accumulator. In this fashion, at the end of a frame, the counters will hold the averaged (summed) time delay results, which results are read-out to memory. The counter contents are now cleared, and the counters are now available to perform analog-to-digital conversion of brightness values that have accumulated in the accumulator. After analog-to-digital conversion of the brightness values, the value is read-out from the counters and stored.

Referring to FIG. 12, note that capacitors 410A, 410B are reset at the beginning of each pulse, and their charge following integration is quickly transferred into accumulator capacitors 490A, 490B. Thus, as a result, only the photons received by pixel photodiode 240-1 during the integration periods will contribute to the brightness value. In the preferred embodiment, the charge integration period is a small fraction of the total time, perhaps 0.01%. Hence the effect of ambient light upon detector array 230 is reduced by a substantial factor, perhaps ten-thousand times or so. In this fashion, brightness values captured by applicants' smart pixel array differ significantly differs from values captured by prior art digital cameras.

As noted, integration time preferably is a small percentage of the total time. This permits powering-down or even powering-off various circuits and amplifiers during times when they are not required. For example, operating potential may be turned-off to smart pixel components such as amplifier 400, amplifier 440, current mirror 450, and Schmitt trigger 470, when these components are not being used. Understandably, the ability to power-down operating voltage for an appreciable part of the operating cycle for system 200' improves efficiency, and permits operating system 200' from one or more batteries. However even during a low-power mode, care must be taken to ensure that accumulation amplifier 500 properly retains charge on capacitors 490A, 490B.

Referring once more to FIG. 10, consider now the overall operation of system 200'. At time t0, microprocessor 260 commands light source 220 to emit a pulse (Psent in FIG. 11A) of known wavelength, preferably a laser-output light pulse. This pulse passes through focus lens 290' and travels to object 20 at the speed of light (C), 300 Km/sec. If light source 220 is sufficiently powerful, lens 290' may be dispensed with. At the surface of the object 20 being imaged at least some of the light may be reflected back toward system 200' to be sensed by the detector array after traversing the distance separating system 200' from object 20.

As noted, the fundamental nature of focus lens 290 associated with system 200' is such that reflected light from a point on the surface of imaged object 20 will only fall upon the pixel in the array focused upon such point. Thus, at time t1, photon light energy reflected from the closest point on the surface of object 20 will pass through a lens/filter 290 and will fall upon the pixel detector 240 in array 230 focused upon that point. A filter associated with lens 290 ensures that only incoming light have the wavelength emitted by light source 220 falls upon the detector array unattenuated.

Distance Z1 may be determined from the following relationship in which C is the velocity of light:

$$Z1 = C \cdot (t1)/2$$

At some later time t2 photon energy will arrive at lens 290 from a somewhat more distant portion of object 20, and will fall upon array 230 and be detected by another pixel detector, at time t3 perhaps photon energy will arrive from an even more distance point on the target object, and so forth.

Within IC 210, controller 260 executing software stored in memory 270 can calculate distance and velocity associated with the TOF data for each light reflecting point on the object surface using the relationship noted earlier, namely:

$$TOF = ET - IT$$

Such data, or even raw TOF data, may be exported from the IC as DATA, perhaps to be further processed off-chip. Preferably any or all of this data (denoted DATA in FIG. 10) can be exported from the IC to an external computer for further processing, for example via a universal serial bus. It will be appreciated that output from CMOS-compatible detectors 240 may be accessed in a random manner if desired, which permits outputting TOF DATA in any order. As noted, by emitted light pulses having a specific wavelength, and by filtering out incoming light of different wavelength, system 200' can operate with or without ambient light, including operating in ambient darkness.

Some pixels in the array may of course not receive sufficient reflected light from the object point upon which they are focused. In the present invention, if insufficient energy is detected from the target object, relevant timing capacitors will run out of dynamic range, in which case the object may be considered to be at distance Z=infinity.

Figure 13:
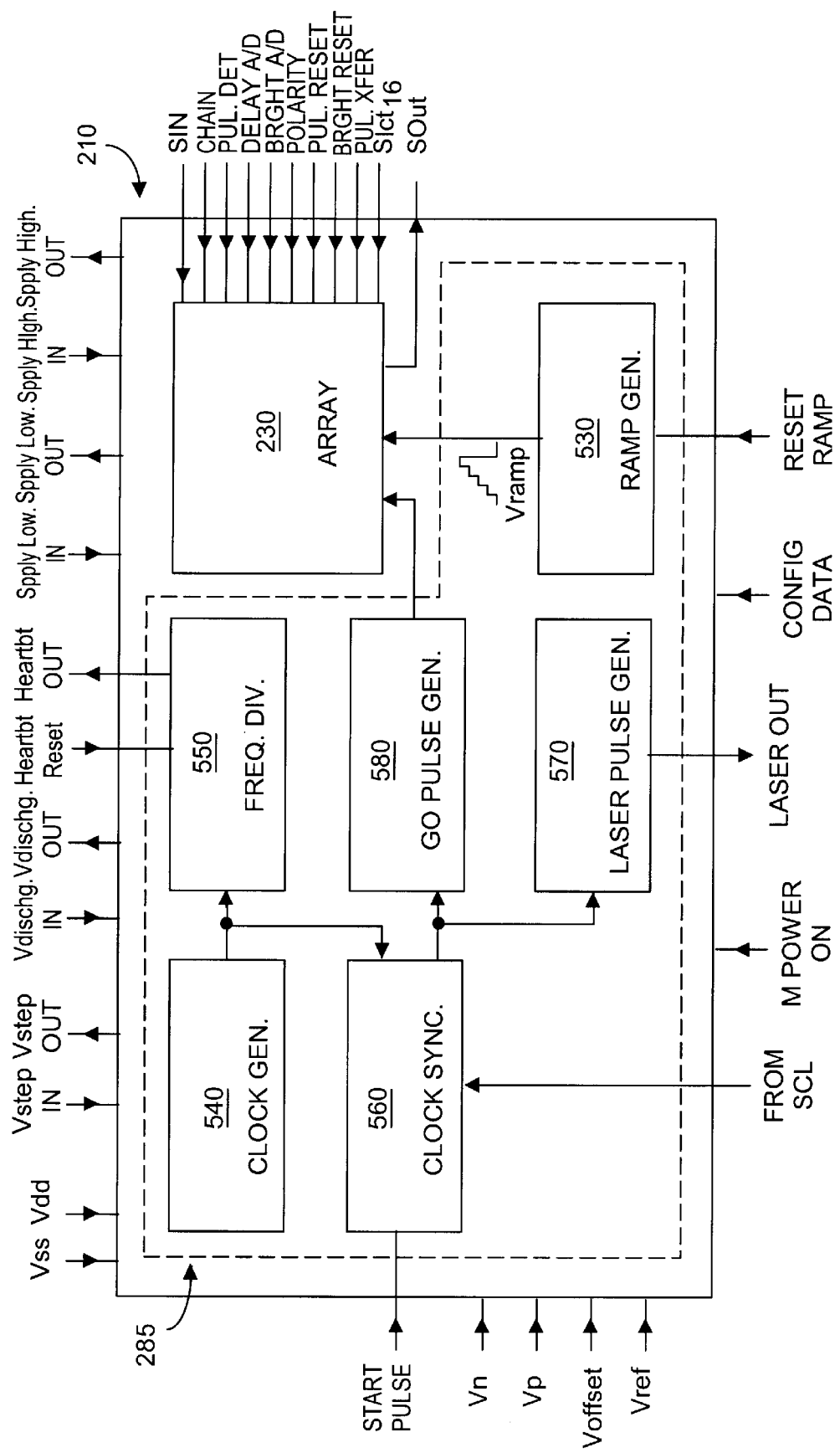
FIG. 13 is a block diagram of a portion of the on-chip circuitry used to support smart pixel arrays, according to the present invention.

FIG. 13 depicts a portion of the analog and digital circuitry on IC 210 that helps support smart pixel array 230. Programmable voltage generator 530 generates the Vramp stair-step signal that is used to generate reference voltages used for analog-to-digital conversion of pixel-detected time delay values and brightness values. (See FIG. 12, Schmitt trigger 470.) As shown in FIG. 13, the Vramp signal is coupled to smart pixel array 230 in lockstep synchronization with a digital clock signal.

A preferably high speed (e.g., perhaps 1 GHz) clock generator 540 outputs a typically single-phase clock signal used to control timing of the energy pulses transmitted by emitter 220, typically laser pulses, and to control timing of the GO signal. Clock generator 540 may advantageously be constructed using a ring oscillator configuration, e.g., a series of CMOS inverts are connected in a chain such that the last inverter output is coupled to the first inverter input. The number of inverters in the chain is selected such that oscillation frequency is in the GHz range. Using 0.35 µm devices, a chain of about 10 elements will oscillate at about 0.5 GHz. Frequency divider 550 generates a frequency-divided version of the high speed clock signal, and the divided lower-frequency clock signal is compared against a reference clock, preferably 50 MHz. The result of this frequency comparison is used to calculate the precise frequency of the preferably ring oscillator clock generator 540.

Those skilled in the art will appreciate that the earlier-described PRSC counters are advantageously small in size and fast in operation. Thus, referring to FIG. 13, the frequency divider 550, laser pulse generator delay unit 570, and GO pulse generator 580 operate at GHz rates, and are PRSC counters implemented using a TSPC methodology. The description of FIG. 4, a 15-bit counter, earlier herein is useful to understanding operation and implementation of such counters even though they are not 15-bit counters. Note that while counters associated with pixel circuits 253 are PRSC (since small size is a consideration), these counters need not be implemented in TSPC as they are not required to function at high speed. As such, these counters do not precisely correspond to FIG. 4, and will use two-phase clocking rather than DFFs, and no 15-bit high speed counters will be used.

Sensor support circuitry 255 (see FIG. 10) includes sensor control logic (SCL) implemented functionally as elements 255 and/or 285 in FIG. 10. The SCL circuitry handles handshaking between sensor array 230 and the various support circuitry in system 200'. A synchronizer circuit 560 is used to convert a START pulse requested by the SCL into a pulse train referenced to the high speed clock signal generated by circuit 540.

Energy source pulse generator 570 causes emitter 220 to fire a typically laser pulse (e.g., Psent in FIG. 11A) whose pulse width PW will be a precise number of high frequency clock cycles, the firing pulses being synchronized to the high speed clock signal. Generator 570 may be implemented with a pseudo random sequence counter (PRSC). Such counters were described later herein, especially with reference to FIG. 4. It will be appreciated that pulse generator 570 must function adequately with the single-phase perhaps 1 GHz output signal from high speed clock generator 540. As noted, by implementing clock generator 540 as a true single-phase clock system, the duration (pulse width) of the laser or other energy pulse output by emitter 220 can be precisely controlled, using counter values associated with implementation of generator 570.

GO pulse generator 580 outputs a GO pulse that is synchronized with the high-speed clock signal available from generator 540, but delayed in time by a programmable number of counts of the high-speed clock signal, typically 10 ns to 20 ns or so delayed. Using this programmable delay, the dead time associated with pixel elapsed time may be precisely controlled, e.g., the actual delay from the instant the energy emitter 220 is commanded to fire a pulse until pulse firing occurs. Further, a receiving photodiode does not instantly respond to receipt of incoming photon energy. Accuracy is maximized by using a high rate of discharge for the Ctime timing capacitor associated with each smart pixel 240 in pixel array 230. Referring briefly to FIG. 12 and the role of Schmitt trigger 440, it is required that the voltage signal across timing capacitor Ctime does not completely discharge before Schmitt trigger 440 trips. Thus, the GO pulse signal provided by generator 580 will be appropriately delayed in time. As noted above, GO pulse generator 580 may be implemented using a PRSC implemented in a TSPC methodology.

A further description of processor components 262, 264, 266 comprising processor system 260 will now be given. As noted, sensor control logic (SCL) circuitry 255, 285 in FIG. 10 is responsible for handshaking between the sensory array and sensor support circuitry, and control microprocessor 262. The various units comprising unit 285 are shown in FIG. 13.

A chain of serial data output from sensor array 230 is partitioned into processor word-sized packets, perhaps 16-bits in length, before being coupled to the control processor 262. Similarly, during initialization, information to be loaded into a smart pixel 240-N in array 230 is simultaneously acquired in word-sized packets from the processor and is serialized before being coupled to the sensor array. The sensor array requires many control lines for initialization, sequencing, analog-to-digital conversion, power mode control, and so forth. The SCL provides the required control lines to the sensor array, and provides the control microprocessor with a streamlined interface of high-level commands. The sensor control logic also handles routine sequencing operations, e.g., sequence of control lines transitioning from high to low before each emitter 220 pulse firing). The ability of the sensor control logic to handle these chores advantageously offloads such tasks from the control processor.

In the preferred embodiment, the sensor control logic implements fail-safe features to ensure that system 200' operates in a safe mode. For example, the sensor control logic sets a maximum number of output energy pulses (Psent) for time, e.g., perhaps 400 pulses in ⅓₀th of a second), which protects emitter 220 from overload, and protects users in the vicinity of lens 290, 290' from harm. Control processor 262 also contributes to safe operation of system 200'.

When no object (such as object 20) is detected in the area of interest (as defined by an external processor), the control processor will automatically reduce the system frame rate and the number of fired pulses per frame, to conserve operating power (which may be a battery source), and to enhance safety. Yet to the world external to the present invention, processor 260 may send data as if a power-down mode had not occurred. When an object (such as object 20) is sensed within the area of interest, the control processor commands full power-mode operation, whereupon pulse rate and frame rate are increased. The control processor also promotes safety if an object is detected too close to sensor 230, and will reduce pulse rate and/or frame rate until the detected object is no longer within a too-close zone of potential danger, e.g., where emitted radiation from the invention might danger users.

Referring again to FIG. 10, data processor 264 interprets data acquired by the overall system, e.g., including the sensor array, sensor support circuitry, sensor control and processor interface, and control processor system. Data processor 264 analyzes array-acquired data and can translate the data into commands for use by external host devices including without limitation, a PDA, cell phone, set-top box, etc. A number of different types of commands may be generated depending upon the application with which the system is used, for example, keystrokes, mouse events, etc. In the preferred implementation, if the control processor has sufficient available cycles it may time-slice between its control processor tasks and data processor tasks. The data processor also acts to promote overall system safety, such that for each frame or each several frames, the control processor requires a grant signal from the data processor to fire emitter 220 for those frames. Stated differently, in the absence of an active grant state from the data processor, system 200' will not emit pulses.

In addition to controlling operation of sensor array 230, sensor system 260 and primarily control processor 262 issues command signals to the sensor control logic to initiate emitter 220 firing, and to govern sequencing of signals within the array. The control processor also keeps track of the number of pulses (Psent) to be generated per frame, and performs the required read of the pixel detection signals, and supervises conversion of the analog data into digital format. When a particular use of system 200' (or system 200) results in an external request for a certain image resolution, the control processor determines the appropriate emitter firing rate, and associated parameters, and ensures that the system parameters needed for the desired resolution are carried out.

All unary operations performed on pixel data may be pre-computed before reading-out a frame or series of frames, and may be collapsed into a single translation table. Thus, translation from PRSC counters, averaging, and global data corrections may be pre-computed into a single table that is stored or loadable into memory 270. The raw data from a pixel will usually be about 15-bits, and the above-noted single table can produce a different number of bits, perhaps 8-bits.

The input/output or communications processor 266 is involved with setting up a communication channel via a bus to the proper (if there are more than one) external host. Such commands may be sent via bus or other communications channels such as serial interface, USB, IEEE 1394, Ethernet network, among others. It is noted that if the control processor or the data processor have sufficient cycles, these processors may time-slice between their own tasks and I/O processor tasks.

It will be appreciated that many samples of array-acquired data must be averaged for use in producing a frame. Such averaging may be accomplished by reading-out the digital values of counters 480 associated with smart pixel array 320, and then averaging each sample for each pixel. For example, assume a frame rate of 30 frames/second, and that one-hundred pulses are required for each frame. If array 210 includes 100×100 pixel detectors, then 30·100·10,000 or 30,000,000 averaging additions must be carried out each second. If array 210 is substantially greater than 100×100 pixels, and/or if the sampling rate is increased, then the number of averaging additions that must be carried out per second can be even more substantial.

The use of PRSC within the present invention dictates the presence of a translation table to convert shirt register readings into traditional binary values, e.g., 1's or 2's complement values. The size of the translation table will grow exponentially as the number of bits in the PRSC counter. For a 15-bit counter the translation table will have 32K entries, the translation table size becomes unduly large for much beyond 15-bit counter size. Nonetheless, the benefits of using PRSCs outweigh the need for a translation table, since a single translation table is used to serially convert values from each PRSC counter.

In addition to providing a simple configuration, high speed performance, and small size, PRSC counters advantageously are fabricated from shift registers and with appropriate configuration circuitry can mimic a shift register. Hence it is possible to shift in and count values from the counter, to accomplish counter loading/reading. A signal CHAIN generated external to array 210 is coupled to each pixel within array. The effect is to force each counter 480 in the array into effectively a large shift register of perhaps 15·100·100=150,000 bits. This 150,000-bit shift register chain can then be used to serially shift out the data from array 210. New data can be simultaneously loaded into the array by shifting appropriate values into the large shift register chain. Often a series of unary transformations may be applied to the data from the PRSC counter. Such transformations may be concatenated into a single translation table. The number of outputs of the translation table need not be the same as the number of bits in the input. For example if an 8-bit averaged value is required, the translation table will have 8 output bits per entry.

To summarize, it will be appreciated that the present invention comprises an array of preferably smart pixels, sensor array support circuitry, sensor control and processor interface circuitry, and controller circuitry including a control processor. The system is implemented without requiring a large number of high speed counters (e.g., one counter per each photodiode detector), and without requiring shutter mechanisms. Collectively the resultant overall system may be considered by an external user as a single imaging component that can accept a high level request for data of a particular resolution, and responsive to control processor action will then execute a proper number of energy pulses and operation sequences and data conversions necessary to provide the resolution desired. The interface to the external user is simplified in that internal details of particular calculations and sampling and conversions needed to provide the resolution are hidden. The system is sufficiently low in power consumption as to be operated from a battery power supply.

Modifications and variations may be made to the disclosed embodiments without departing from the subject and spirit of the invention as defined by the following claims.

What is claimed is:

1. A method to determine distance Z within resolution $\Delta Z$ between at least one pixel photodiode detector and a target less than about 100 m distant, the method comprising the following steps:

(a) at time t0 emitting toward said target at least a first pulse of optical energy having a pulse width PW from an optical energy source;

(b) disposing at least one pixel photodiode detector so as to detect optical energy reflected from said target, where each said pixel photodiode detector has an associated pixel photodiode detector circuit, each said pixel photodiode detector having an integration delay time exceeding $2 \cdot \Delta Z/C$, where C is speed of light;

(c) integrating a detected brightness signal B(t) output from each said pixel photodiode detector responsive to detection of at least some reflected said optical energy and determining an elapsed time ET from t0 to when said B(t) attains a predetermined threshold value, wherein slope of B(t) is B/PW, where B is magnitude of B(t) after integrating over a time equal to PW;

(d) determining time-of-flight TOF representing time from t0 to when said photodiode begins to detect at least some reflected said optical energy, where TOF= ET−IT, where IT is integration time and is proportional to PW/B; and (e) determining from said TOF and from C a distance from each said pixel photodiode detector to a portion of said target reflecting said optical energy;

wherein said pixel photodiode detector acquires delay time data and pulse brightness data simultaneously.

2. The method of claim 1, wherein said delay time data is time for light to travel from said optical energy source to said target and be reflected to said pixel photodiode detector and to build-up detectable signal strength at said pixel photodiode detector.

3. The method of claim 1, wherein said pulse brightness data is total signal detected from at least one said pulse of optical energy detected by said pixel photodiode detector.

4. The method of claim 1, wherein:

step (b) includes disposing an array of pixel photodiode detectors so as to detect optical energy reflected from said target, each of said pixel photodiode detectors having an associated pixel photodiode detector circuit; and providing means for accumulating overtime a number N of signal samples from each said pixel photodiode detectors;

wherein measurement accuracy is enhanced proportional to $\sqrt{N}$.

5. The method of claim 1, wherein:

step (b) includes disposing an array of pixel photodiode detectors so as to detect optical energy reflected from said target, each of said pixel photodiode detectors having an associated pixel photodiode detector circuit; and said array comprises Y·Y pixel photodiode detectors and Y·Y pixel photodiode detector circuits, where Y is an integer greater than ten.

6. The method of claim 1, wherein step (c) includes integrating by coupling an output from said pixel photodiode detector to a first capacitor.

7. The method of claim 6, wherein step (c) includes integrating differentially using a second voltage-tunable capacitor matched within a tolerance of about ±2% to said first capacitor.

8. The method of claim 1, wherein:

integration at step (c) is carried out by said pixel photodiode detector circuit, said pixel photodiode detector circuit including KT/C offset reduction architecture.

9. A CMOS-implementable integrated circuit (IC) time of flight (TOF) measurement system used with an optical pulse source to determine distance Z within resolution $\Delta Z$ between said IC and a target, the IC including:

an array of pixel photodiode detectors to detect reflected optical pulse energy returned from said target, said pixel photodiode detectors able to acquire delay time data and pulse brightness data simultaneously and having an integration delay time exceeding $2 \cdot \Delta Z/C$, where C is speed of light;

for each of said pixel photodiode detectors, an associated pixel photodiode detector circuit that includes:

means for integrating a detected brightness signal B(t) output from each said pixel photodiode detector responsive to detection of at least some reflected said optical energy, where said IC causes a pulse of optical energy to be emitted at time t0;

means for determining an elapsed time ET from t0 to when said B(t) attains a predetermined threshold value, wherein slope of B(t) is B/PW, where B is magnitude B(t) after integrating over a time equal to PW;

means for determining time-of-flight TOF representing time from t0 to when said pixel photodiode detector begins to detect at least some reflected said optical energy, where TOF=ET−IT, where IT is integration time and is proportional to PW/B;

said IC further including a processor unit to determine from said TOF and from C a distance from each said pixel photodiode detector to a portion of said target reflecting said optical energy.

10. The IC of claim 9, wherein said delay time data is time for light to travel from said optical pulse source to said target and be reflected to said pixel photodiode detector and to build-up detectable signal strength at said pixel photodiode detector.

11. The IC of claim 9, wherein said pulse brightness data is total signal detected from at least one said pulse of optical energy detected by one said pixel photodiode detector.

12. The IC of claim 9, further including means for accumulating over time a number N of signal samples from each of said pixel photodiode detectors;

wherein measurement accuracy is enhanced proportional to $\sqrt{N}$.

13. The IC of claim 9, wherein said IC includes a detector array comprising Y·Y pixel photodiode detectors and Y·Y pixel photodiode detector circuits, where Y is an integer greater than ten.

14. The IC of claim 9, wherein said means for integrating includes coupling an output from each said pixel photodiode detector to a first capacitor in an associated said photodiode detector circuit.

15. The IC of claim 14, wherein said means for integrating includes a differential integrator comprising a second voltage-tunable capacitor matched within a tolerance of about ±2% to said first capacitor.

16. The IC of claim 9, wherein each said pixel photodiode detector circuit includes means for reducing KT/C offset.

* * * * *